(12) United States Patent
Mason et al.

(10) Patent No.: US 10,576,850 B2
(45) Date of Patent: Mar. 3, 2020

(54) CHILD SAFETY SEAT

(71) Applicant: Wonderland Nurserygoods Company Limited, Tuen Mun, N.T. (HK)

(72) Inventors: Kyle S. Mason, West Lawn, PA (US); Colin P. Hansel, Philadelphia, PA (US); Andrew J. Taylor, Mohnton, PA (US); Curtis M. Hartenstine, Birdsboro, PA (US)

(73) Assignee: Wonderland Nurserygoods Company Limited, Tuen Mun (HK)

( * ) Notice: Subject to any disclaimer, the term of this patent is extended or adjusted under 35 U.S.C. 154(b) by 0 days.

(21) Appl. No.: 16/029,288

(22) Filed: Jul. 6, 2018

(65) Prior Publication Data
US 2018/0312085 A1    Nov. 1, 2018

Related U.S. Application Data

(62) Division of application No. 15/162,841, filed on May 24, 2016, now Pat. No. 10,040,377.
(Continued)

(51) Int. Cl.
*A47C 1/08* (2006.01)
*B60N 2/28* (2006.01)

(52) U.S. Cl.
CPC ......... *B60N 2/2806* (2013.01); *B60N 2/2821* (2013.01); *B60N 2/2845* (2013.01)

(58) Field of Classification Search
CPC .. B60N 2/2821; B60N 2/2812; B60N 2/2884; B60N 2/42709; B60N 2/42736;
(Continued)

(56) References Cited

U.S. PATENT DOCUMENTS

| | | | |
|---|---|---|---|
| 5,611,596 A | 3/1997 | Barley et al. | |
| 6,042,182 A * | 3/2000 | Geis | B60N 2/2821 248/188.4 |

(Continued)

FOREIGN PATENT DOCUMENTS

| | | |
|---|---|---|
| CN | 201161559 Y | 12/2008 |
| CN | 203611798 U | 12/2013 |

(Continued)

OTHER PUBLICATIONS

The Search Report dated Nov. 24, 2016 in co-pending UK Patent Application No. 1609219.9.
(Continued)

*Primary Examiner* — Chi Q Nguyen
(74) *Attorney, Agent, or Firm* — NZ Carr Law Office PLLC

(57) ABSTRACT

A support base for a child safety seat includes a shell body and a belt restraining frame. The shell body is adapted to support a child seat, and has an upper surface provided with a storage cavity sized to receive an attachment strap and two latch connectors. The belt restraining frame is pivotally connected with the shell body, and is rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity.

19 Claims, 22 Drawing Sheets

Related U.S. Application Data

(60) Provisional application No. 62/166,782, filed on May 27, 2015, provisional application No. 62/214,013, filed on Sep. 3, 2015, provisional application No. 62/253,658, filed on Nov. 10, 2015.

(58) Field of Classification Search
CPC .. B60N 2/2806; B60N 2/2842; B60N 2/2824; B60N 2/427
USPC ............ 297/256.16, 256.11, 253, 250.1, 482
See application file for complete search history.

(56) References Cited

U.S. PATENT DOCUMENTS

| | | | |
|---|---|---|---|
| 6,152,528 A | 11/2000 | Van Montfort | |
| 6,318,799 B1 | 11/2001 | Greger et al. | |
| 6,554,358 B2 | 4/2003 | Kain | |
| 6,705,676 B1 | 3/2004 | Berringer et al. | |
| 6,863,345 B2 | 3/2005 | Kain | |
| 7,059,677 B2 | 6/2006 | Balensiefer et al. | |
| 7,926,874 B2 | 4/2011 | Hendry | |
| 7,950,738 B2 | 5/2011 | Shafer et al. | |
| 7,988,230 B2 | 8/2011 | Heisey et al. | |
| 8,348,337 B2 | 1/2013 | Franck et al. | |
| 8,353,559 B2 | 1/2013 | Williams et al. | |
| 9,016,781 B2 | 4/2015 | Cheng et al. | |
| 10,035,436 B2* | 7/2018 | Zhou | B60N 2/2806 |
| 10,040,377 B2* | 8/2018 | Mason | B60N 2/2806 |
| 2002/0074840 A1 | 6/2002 | Nakagawa et al. | |
| 2003/0151286 A1 | 8/2003 | Kain | |
| 2006/0138825 A1 | 6/2006 | Eros | |
| 2009/0066131 A1 | 3/2009 | Hendry | |
| 2011/0169309 A1 | 7/2011 | Williams et al. | |
| 2011/0272983 A1 | 11/2011 | Fritz et al. | |
| 2013/0119732 A1 | 5/2013 | Wuerstl | |
| 2014/0008955 A1 | 1/2014 | Spence et al. | |
| 2014/0300155 A1 | 10/2014 | Lehman et al. | |
| 2015/0183341 A1 | 7/2015 | Carpenter | |
| 2016/0046213 A1 | 2/2016 | Kirstein | |
| 2018/0186254 A1* | 7/2018 | Chen | B60N 2/2821 |
| 2018/0345827 A1* | 12/2018 | Anderson | B60N 2/2806 |

FOREIGN PATENT DOCUMENTS

| | | |
|---|---|---|
| CN | 103507674 A | 1/2014 |
| CN | 203974608 U | 12/2014 |
| DE | 69705413 T2 | 9/1999 |
| DE | 202010008803 U1 | 2/2011 |
| WO | 9806289 A1 | 2/1998 |
| WO | 2013061308 A2 | 5/2013 |
| WO | 2016032633 A1 | 3/2016 |

OTHER PUBLICATIONS

The Search Report dated Nov. 29, 2016 in co-pending UK Patent Application No. 1609201.7.
The Aug. 17, 2017 Office Action from co-pending DE Patent Application No. 102016109690.3, with English Translation.
The Aug. 17, 2017 Office Action from co-pending DE Patent Application No. 102016109691.1 with English Summary.
1st Office Action from parent U.S. Appl. No. 15/162,841 dated Jan. 4, 2018.

* cited by examiner

CHILD SAFETY SEAT

CROSS-REFERENCE TO RELATED APPLICATION(S)

This application is a division of U.S. patent application Ser. No. 15/162,841 filed on May 24, 2016, which respectively claims priority to U.S. provisional application No. 62/166,782 filed on May 27, 2015, to U.S. provisional application No. 62/214,013 filed on Sep. 3, 2015, and to U.S. provisional application No. 62/253,658 filed on Nov. 10, 2015, the disclosures of which are all incorporated herein by reference.

BACKGROUND

1. Field of the Invention

The present invention relates to child safety seats.

2. Description of the Related Art

Safety legislations require the use of a child safety seat for seating a young child in a motor vehicle. The child safety seat usually includes a child seat supported on a bottom base, and can be fastened on the vehicle seat with a seatbelt of the vehicle or a separate strap secured or provided with the child safety seat. Unfortunately, studies reveal that many child safety seats may not be properly installed in practice, which may alter the protective role provided by the child safety seat. The difficulty of properly installing the child safety seat may be due, partly, to the attachment structure or mechanism provided on the child safety seat.

Therefore, there is a need for an improved design that can facilitate the installation of the child safety seat and address at least the foregoing issues.

SUMMARY

The present application describes a child safety seat that includes a support base, and a child seat that can be detachably installed on the support base. According to one embodiment, the support base includes a shell body and a belt restraining frame. The shell body is adapted to support a child seat, and has an upper surface provided with a storage cavity sized to receive an attachment strap and two latch connectors. The belt restraining frame is pivotally connected with the shell body, and is rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity.

According to another embodiment, the support base includes a shell body and a belt restraining frame. The shell body is adapted to support a child seat, and has an upper surface provided with a storage cavity sized to receive an attachment strap and two latch connectors, the storage cavity further containing a movable receptacle adapted to receive the two latch connectors. The belt restraining frame is pivotally connected with the shell body, and is rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity.

DETAILED DESCRIPTION OF THE EMBODIMENTS

Figure 1:
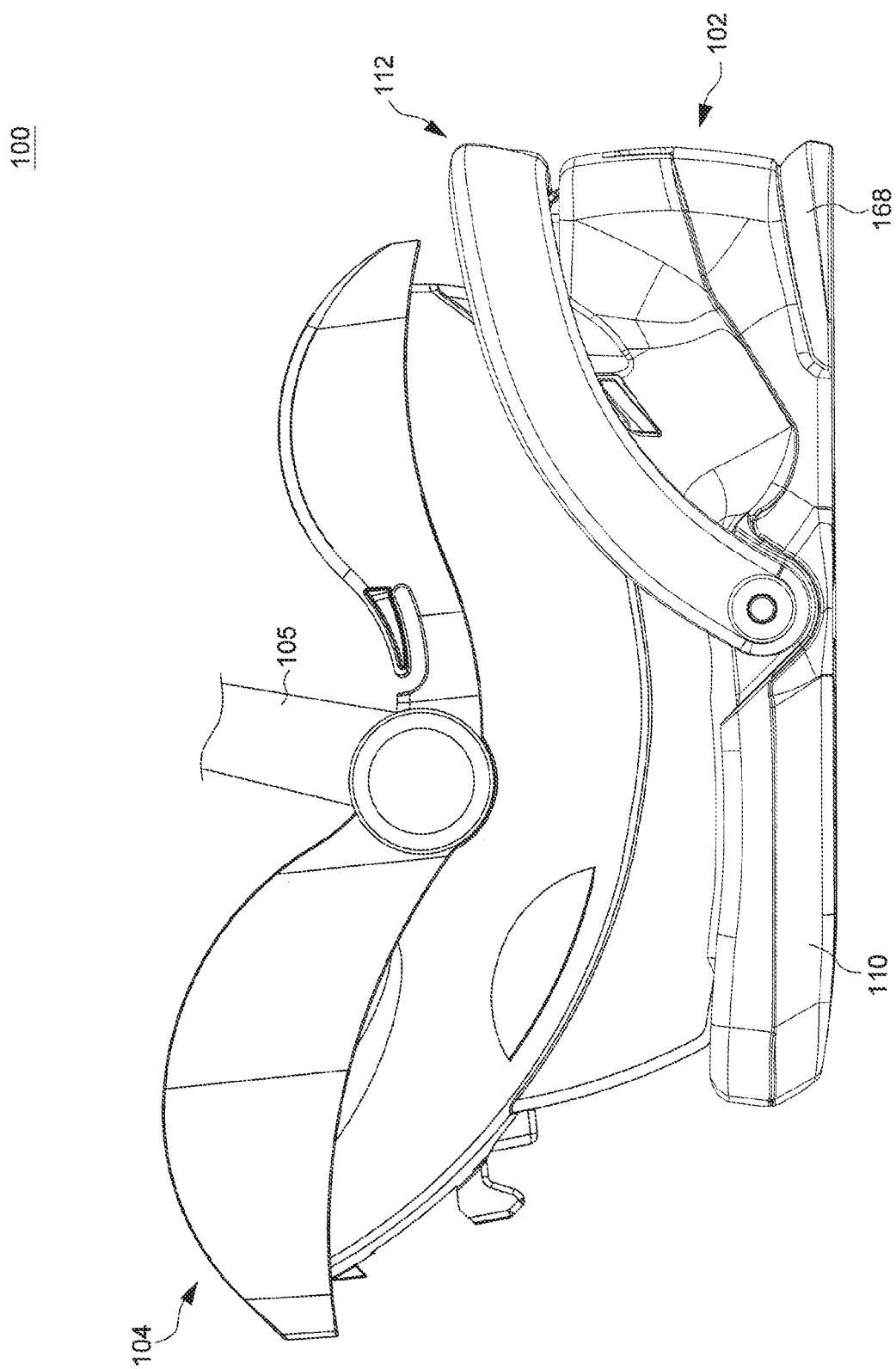
FIG. 1 is a side view illustrating an embodiment of a child safety seat.

FIG. 1 is a schematic view illustrating an embodiment of a child safety seat 100. The child safety seat 100 includes a support base 102, and a child seat 104 that can be detachably mounted on the support base 102. The support base 102 can provide stable support for the child seat 104, and facilitate installation of the child safety seat 100 on a vehicle seat. For example, the support base 102 can have a bottom that can rest in a stable manner on a vehicle seat, while the child seat 104 is installed on the support base 102. The child seat 104 can be adapted to receive a child, and can be assembled with a carrying handle 105 for facilitating transport of the child seat 104.

In conjunction with FIG. 1, FIGS. 2-5 are schematic views illustrating the support base 102. The support base 102 can include a rigid shell body 110 adapted to support the child seat 104, and a belt restraining frame 112 pivotally connected with the shell body 110. The shell body 110 can be made by plastic molding. The shell body 110 can have an area that is defined between two opposite ends 110A and 110B and two opposite lateral sides 110C and 110D of the shell body 110 and is configured to receive the installation of the child seat 104, the two lateral sides 110C and 110D extending between the two ends 110A and 110B (the lateral side 110C can exemplary correspond to a left side and the lateral side 110D can exemplary correspond to a right side). Moreover, the area of the shell body 110 for receiving the child seat 104 can have two regions 110E and 110F of different heights that are respectively adjacent to the two ends 110A and 110B, the region 110E projecting upward higher than the region 110F (i.e., a greatest height of the region 110E is greater than that of the region 110F). The region 110E of the shell body 110 can have two seat mounts 114 that are transversally spaced apart from each other and protrude upward. An upper portion of each seat mount 114 can have a recess 114A in which is provided a hook 116 capable of engaging with a corresponding structure provided at an underside of the child seat 104. The child seat 104 installed on the support base 102 thus can engage with the seat mounts 114 of the shell body 110. When the support base 102 is placed on a vehicle seat, the end 110A of the shell body 110 can be positioned against a seatback of the vehicle seat, and the support base 102 can receive the installation of the child seat 104 in a rearward facing configuration.

Figure 2:
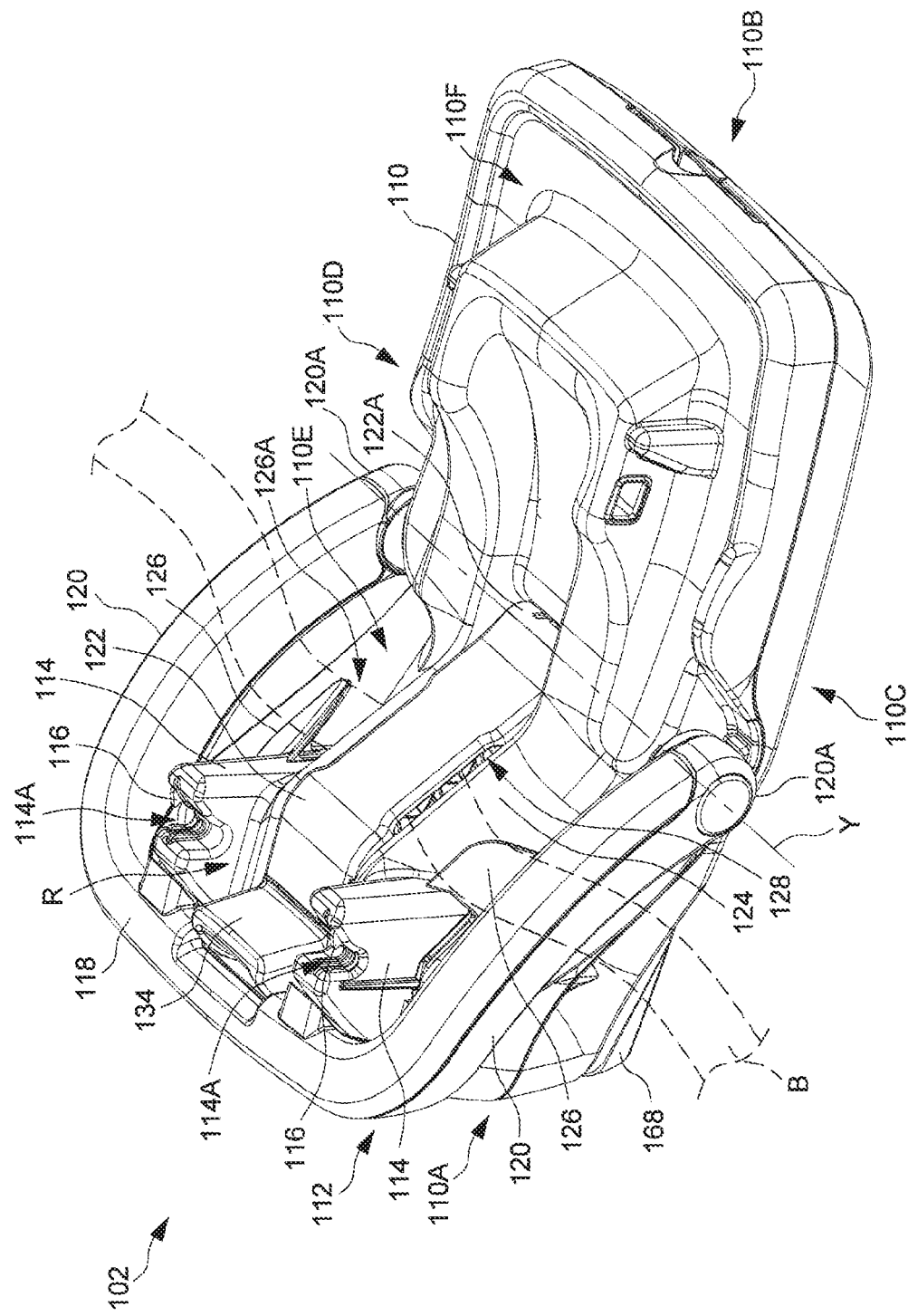
FIG. 2 is a perspective view illustrating a support base of the child safety seat.
Figure 3:
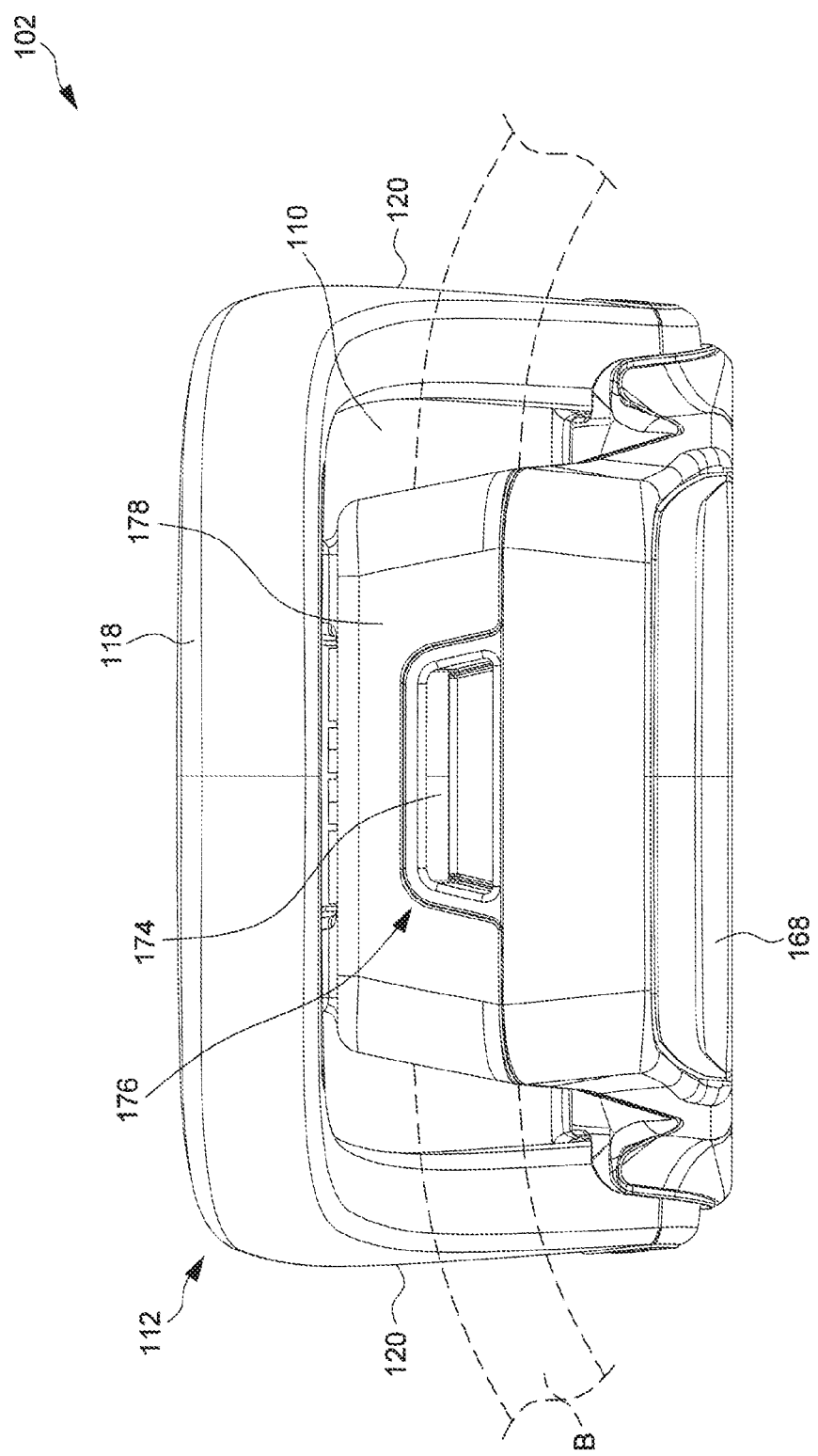
FIG. 3 is a schematic view illustrating an end of the support base.
Figure 4:
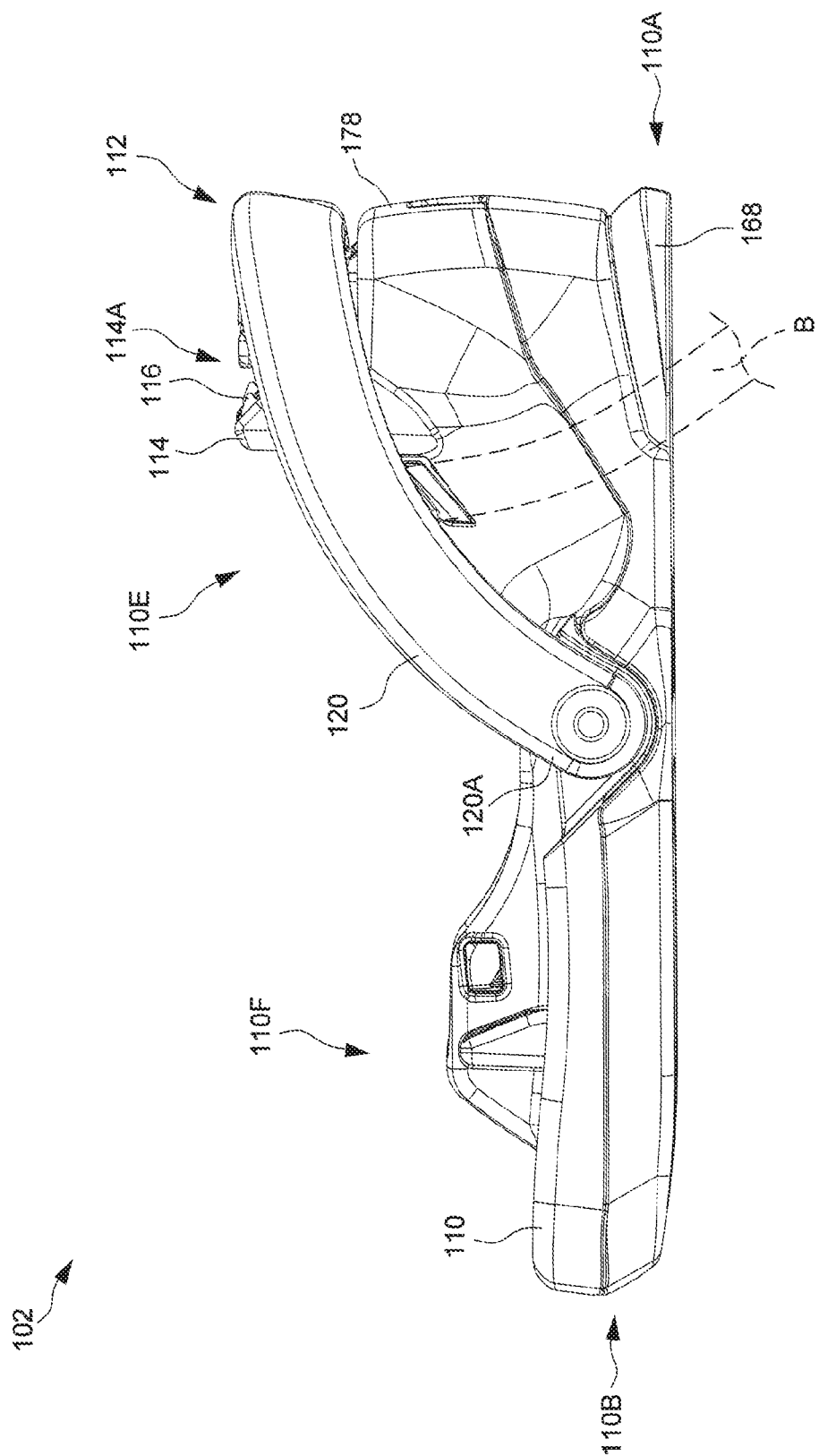
FIG. 4 is a side view illustrating the support base having a belt restraining frame in a clamping position.
Figure 13:
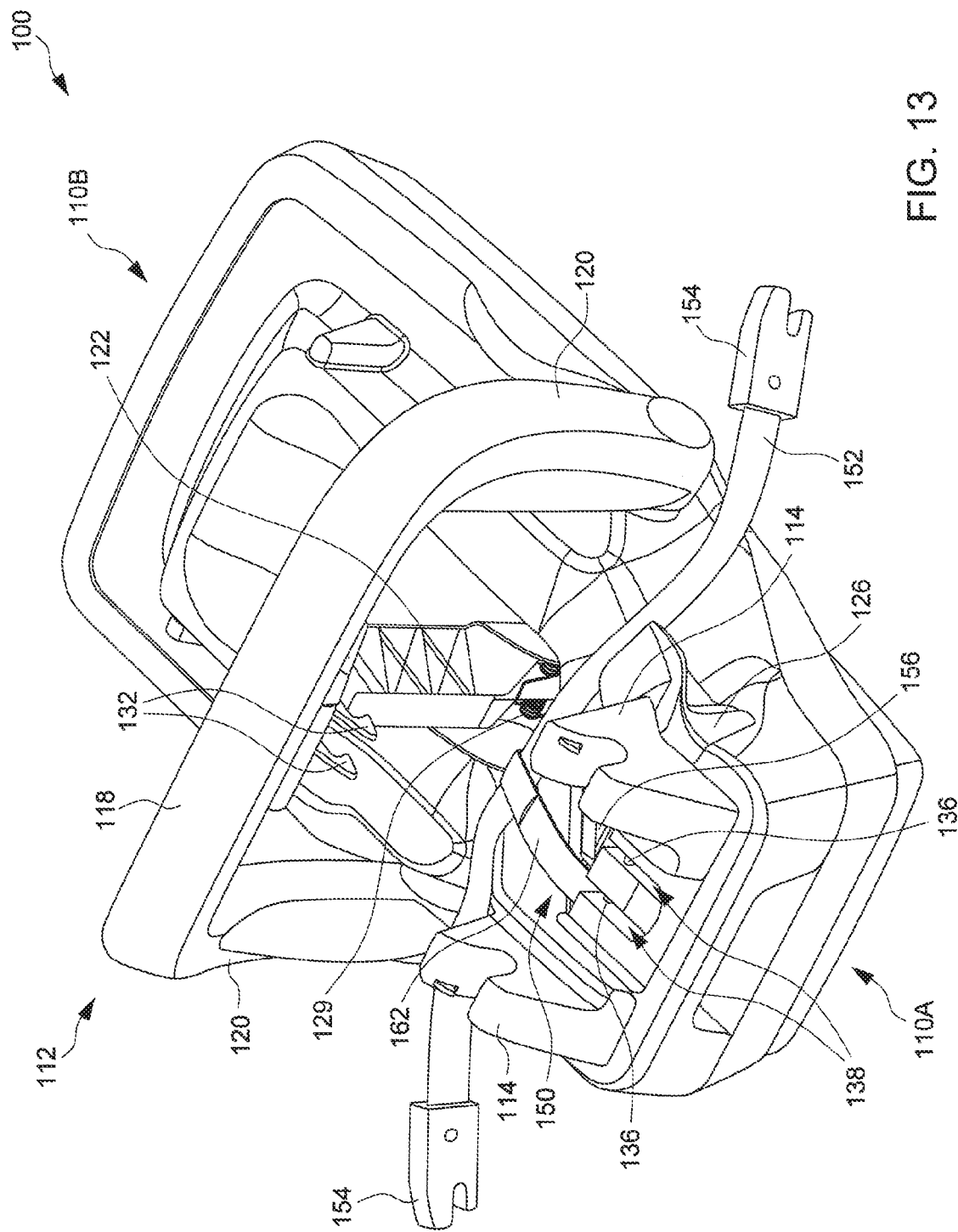
FIGS. 13 and 14 are schematic views illustrating a storage feature provided in the support base.
Figure 14:
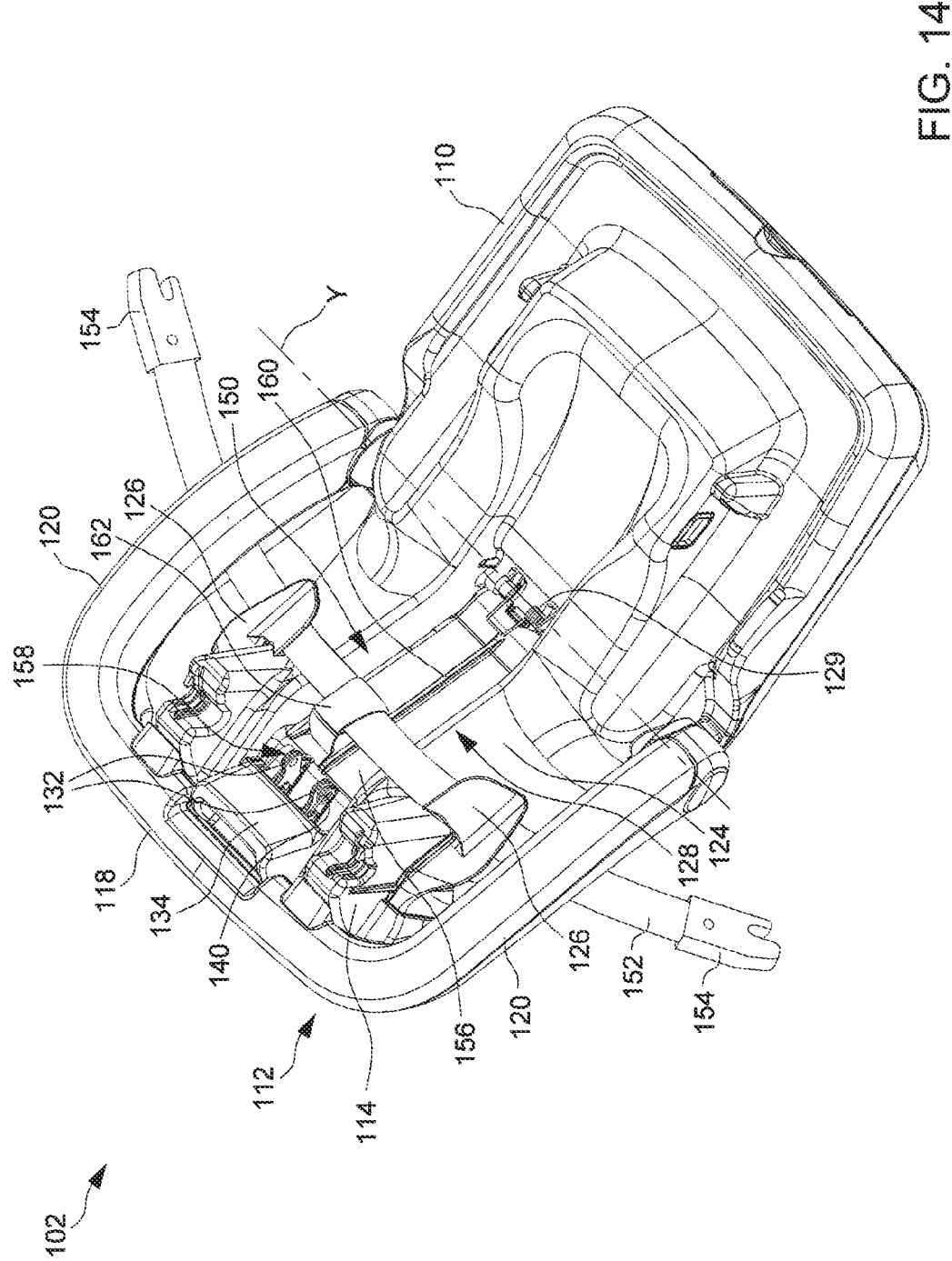

Referring to FIGS. 2-4, an anchoring belt B (shown with phantom lines) may be used to securely fasten the support base 102 on a vehicle seat, the anchoring belt B being a vehicle seatbelt or an attachment strap coupled with the shell body 110. The belt restraining frame 112 can tightly hold the anchoring belt B with the shell body 110, so that the anchoring belt B can securely fasten the support base 102 on a vehicle seat. The belt restraining frame 112 includes a transversal portion 118, two side portions 120, and a middle portion 122 located between the two side portions 120. The two side portions 120 and the middle portion 122 are fixedly connected with the transversal portion 118 so as to form a unitary block having a comb shape. Two ends 120A of the side portions 120 and an end 122A of the middle portion 122 are respectively connected pivotally with the shell body 110 at different locations, the two ends 120A of the side portions 120 respectively connecting with the two lateral sides 110C and 110D of the shell body 110, and the end 122A of the middle portion 122 connecting with a central region of the shell body 110 between the two lateral sides 110C and 110D. The belt restraining frame 112 can thereby rotate about a pivot axis Y extending transversally relative to the shell body 110 between a clamping position (better shown in FIGS. 2-4) and a release position (better shown in FIG. 5). A spring 129 (better shown in FIGS. 6 and 13) may be connected with the middle portion 122 and the shell body 110 for biasing the belt restraining frame 112 toward the clamping position.

Figure 5:
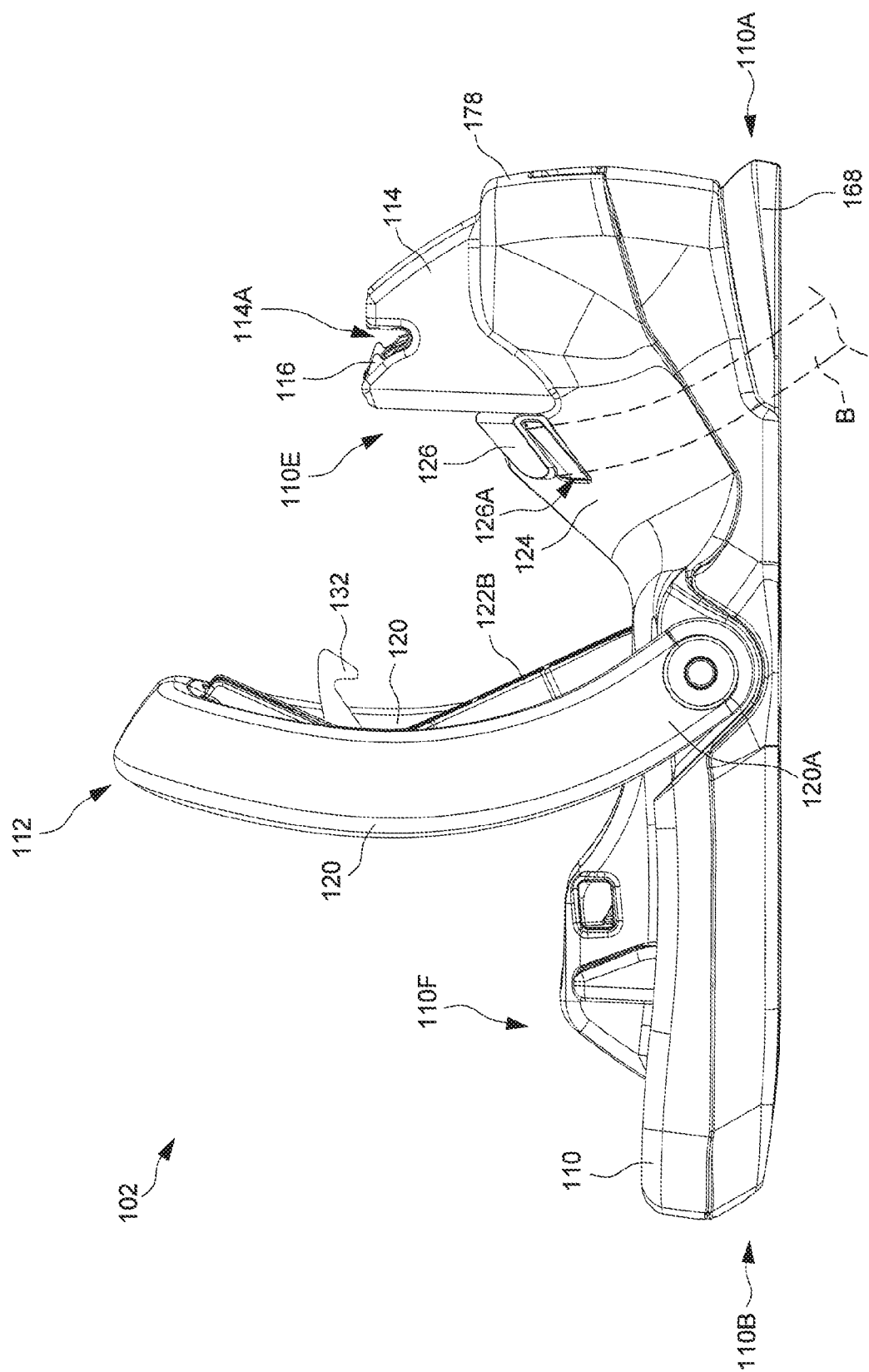
FIG. 5 is a side view illustrating the support base with the belt restraining frame in a release position.

When the belt restraining frame 112 is in the release position shown in FIG. 5, the two side portions 120 and the middle portion 122 rise away from an upper surface 124 of the shell body 110, which allows transversal routing of the anchoring belt B on the upper surface 124 for attaching the support base 102 on a vehicle seat. As it projects upward above the upper surface 124 in the release position, the belt restraining frame 112 can prevent erroneous installation of the child seat 104 while the anchoring belt B is not securely locked in place.

Figure 21:
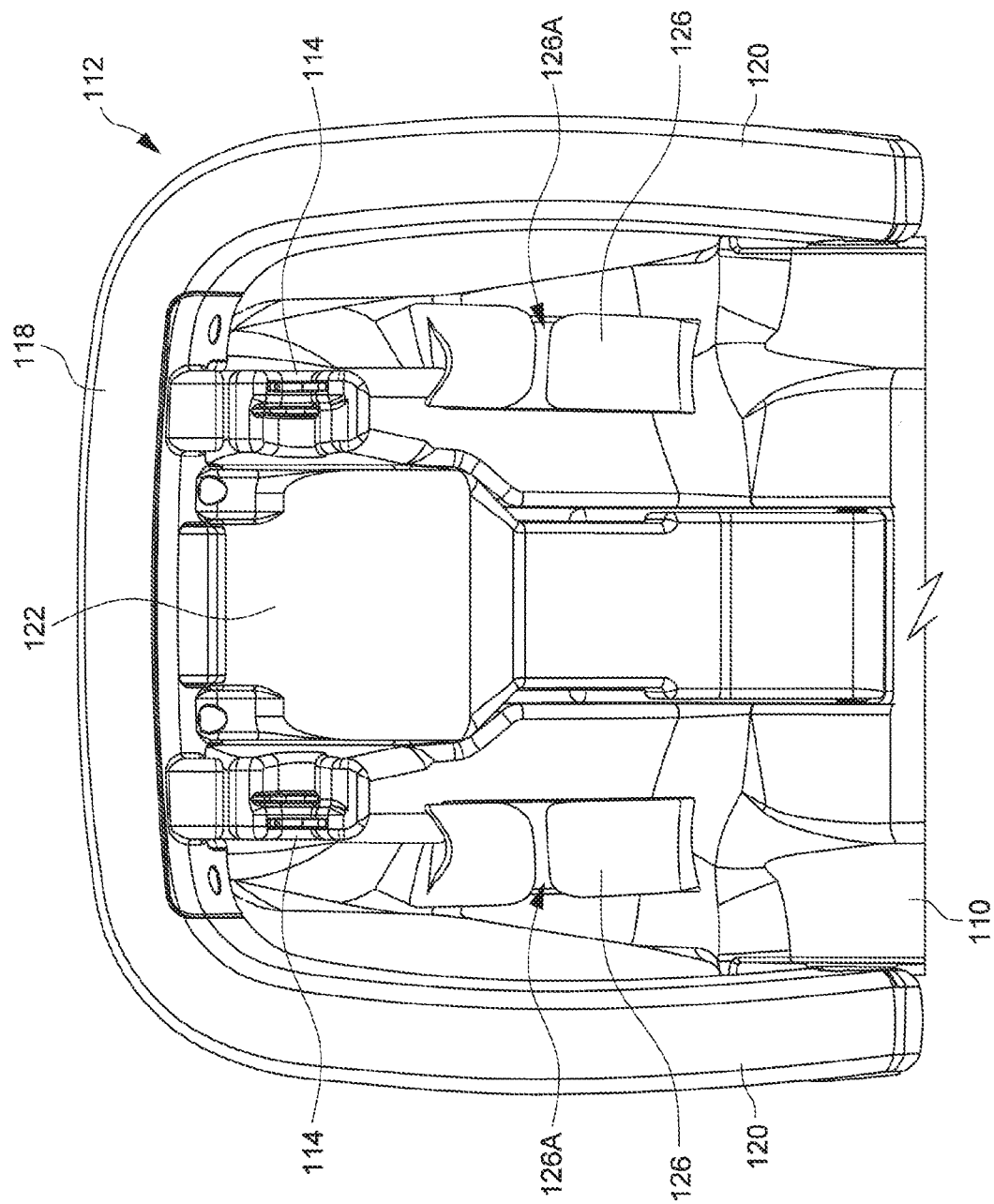
FIGS. 21 and 22 are top and side views illustrating an exemplary embodiment of belt guides provided in the support base.
Figure 22:
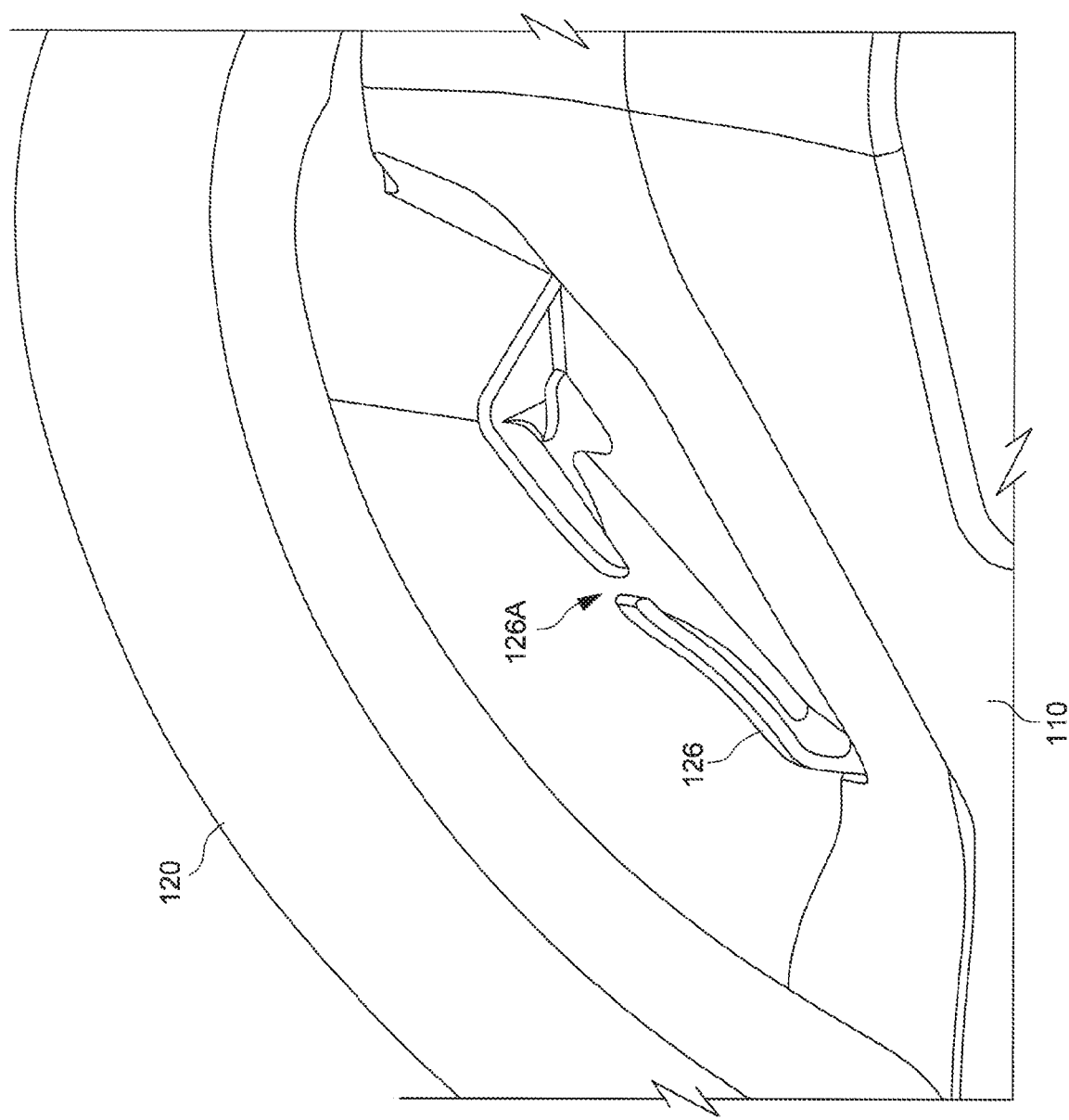

Referring to FIGS. 2 and 5, belt guides 126 may be provided on the upper surface 124 for facilitating the placement of the anchoring belt B. Each belt guide 126 may have a slotted structure for guiding passage of the anchoring belt B on the upper surface 124. For example, each of the belt guides 126 shown in FIGS. 2 and 5 can be generally "C" shaped, the opening 126A of the "C" shape for insertion of the anchoring belt B in the belt guide 126 being oriented downward. FIGS. 21 and 22 are schematic top and side views illustrating a variant example of the belt guides 126 in which the opening 126A of the "C" shape for insertion of the anchoring belt is oriented upward, which can prevent unintentional removal of the anchoring belt from the belt guides 126 (e.g., caused by unintentional slippage of the anchoring belt out of the belt guide 126).

When the belt restraining frame 112 is in the clamping position shown in FIGS. 2-4, the middle portion 122 is substantially adjacent to the upper surface 124 for pressing against the anchoring belt B, which is routed transversally across the shell body 110 and below the two side portions 120 and the middle portion 122. The anchoring belt B is thereby securely held with the shell body 110, and can tightly fasten the support base 102 on a vehicle seat. In one embodiment, the upper surface 124 of the shell body 110 can further include an opening 128, and the belt guides 126 can be positioned on the upper surface 124 at two transversally opposite sides of the opening 128 to route the anchoring belt B across the opening 128. As a result, a lower surface 122B (better shown in FIG. 5) of the middle portion 122 can project into the opening 128 of the upper surface 124 when the belt restraining frame 112 is in the clamping position, and press a portion of the anchoring belt B in the opening 128, which convolutes the belt path for better gripping of the anchoring belt B. The lower surface 122B of the middle portion 122 may have a frictional material (e.g., thermoplastic elastomer) for preventing slippage of the anchoring belt B.

While the belt restraining frame 112 is in the clamping position, the middle portion 122 extends in a region R of the shell body 110 delimited between the two seat mounts 114, the two seat mounts 114 protruding through the two gaps between the middle portion 122 and the two side portions 120. Moreover, the transversal portion 118 and the two side portions 120 can extend around the seat mounts 114 along an outer periphery of the shell body 110. Accordingly, the clamping position of the belt restraining frame 112 allows the installation of the child seat 104 on the upper surface 124 and its engagement with the seat mounts 114.

Figure 6:
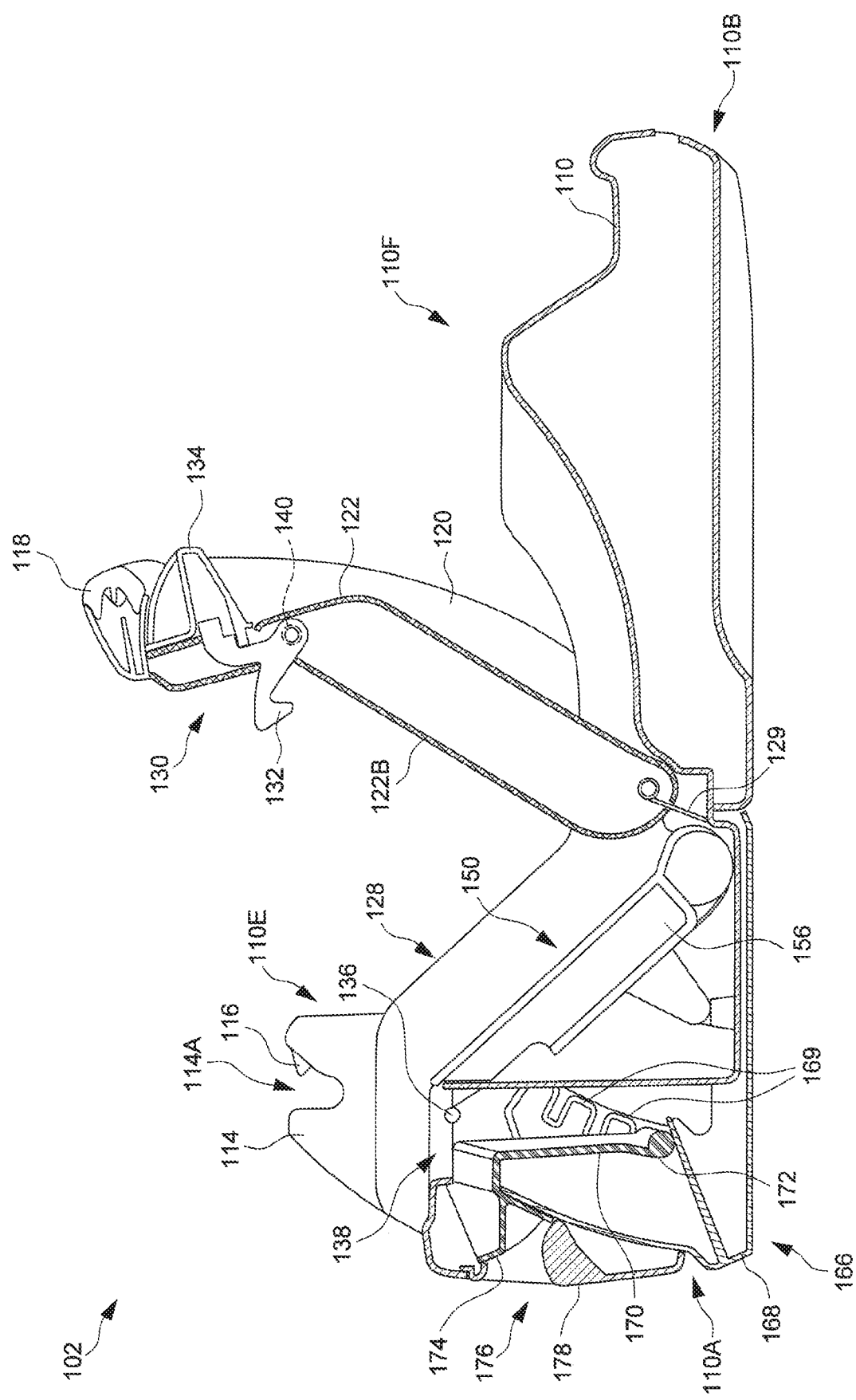
FIG. 6 is a cross-sectional view illustrating the support base with the belt restraining frame in the release position, the belt restraining frame being provided with a latch mechanism for locking the clamping position.
Figure 7:
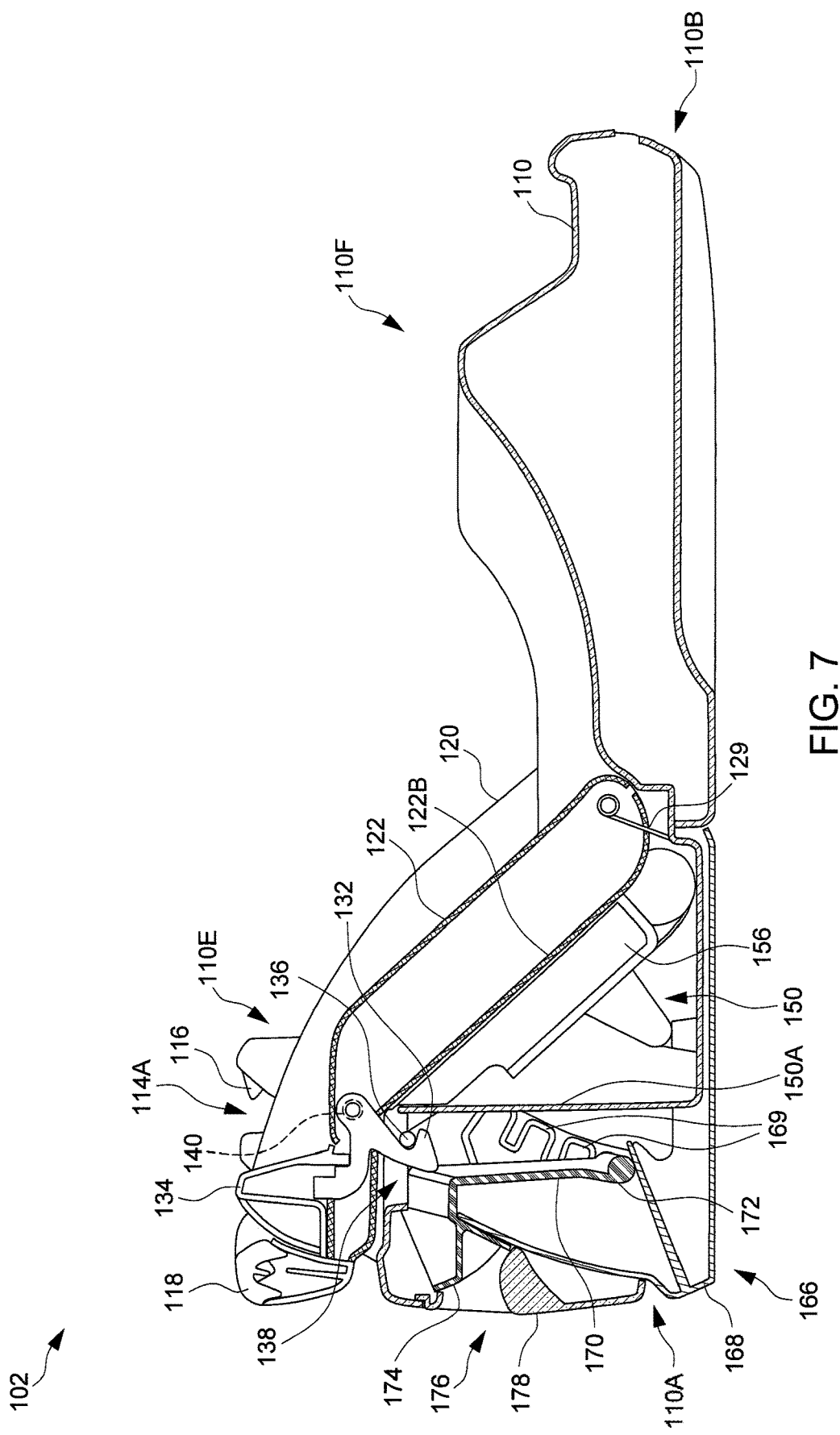
FIG. 7 is a cross-sectional view illustrating the support base with the belt restraining frame in the clamping position.

A latch mechanism can be provided to lock the belt restraining frame 112 with the shell body 110 in the clamping position. The latch mechanism can include a first part provided on the belt restraining frame 112 and a second part provided on the shell body 110, the first and second parts being engaged with each other when the belt restraining frame 112 is locked with the shell body 110 in the clamping position, and the first and second parts being disengaged from each other when the belt restraining frame 112 is in the release position. In conjunction with FIG. 2, FIGS. 6 and 7 are schematic cross-sectional views illustrating an embodiment of a latch mechanism 130 operable to lock and unlock the belt restraining frame 112 with respect to the shell body 110. FIG. 6 shows the support base 102 with the belt restraining frame 112 in the release position, and FIG. 7 shows the support base 102 with the belt restraining frame 112 in the clamping position. Referring to FIGS. 6 and 7, the latch mechanism 130 can include a latching member 132 and a release actuator 134 connected with each other, both of which being assembled with the belt restraining frame 112. More specifically, the latching member 132 can be pivotally connected with the middle portion 122 of the belt restraining frame 112, and can include a hook shape projecting at an underside of the middle portion 122. The release actuator 134 can be disposed adjacent to a junction between the middle portion 122 and the transversal portion 118, and can be exposed for manual operation. In one embodiment, the release actuator 134 can be exemplary affixed with the latching member 132, e.g., by attachment or by having the release actuator 134 and the latching member 132 formed as a single part. The release actuator 134 can be operated to drive an unlocking rotation of the latching member 132.

The latching member 132 can engage with a corresponding structure provided on the shell body 110 to lock the belt restraining frame 112 in the clamping position, and the release actuator 134 is operable to disengage the latching member 132 from the corresponding structure on the shell body for unlocking the belt restraining frame 112 and allow its rotation. In one embodiment, the corresponding structure provided on the shell body 110 for locking engagement of the latching member 132 can be disposed below the middle portion 122 of the belt restraining frame 112. This corresponding structure can include a rod 136 affixed with the shell body 110. The rod 136 may be concealed in an interior of the shell body 110, and the latching member 132 can travel through an upper slit 138 formed through the shell body 110 to engage with the rod 136 for locking the belt restraining frame 112 in the clamping position. A spring 140 (shown with phantom lines in FIG. 6) may be connected with the latching member 132 for biasing the latching member 132 to the locking state for engagement with the corresponding structure on the shell body 110.

When the belt restraining frame 112 is in the clamping position, the latching member 132 can engage with the rod 136 below the middle portion 122 for locking the belt restraining frame 112 with the shell body 110. For unlocking the belt restraining frame 112, the release actuator 134 can be displaced away from the transversal portion 118 so as to drive rotation of the latching member 132 for disengaging the latching member 132 from the rod 136. The belt restraining frame 112 is thereby unlocked, and can be rotated to the release position.

Figure 8:
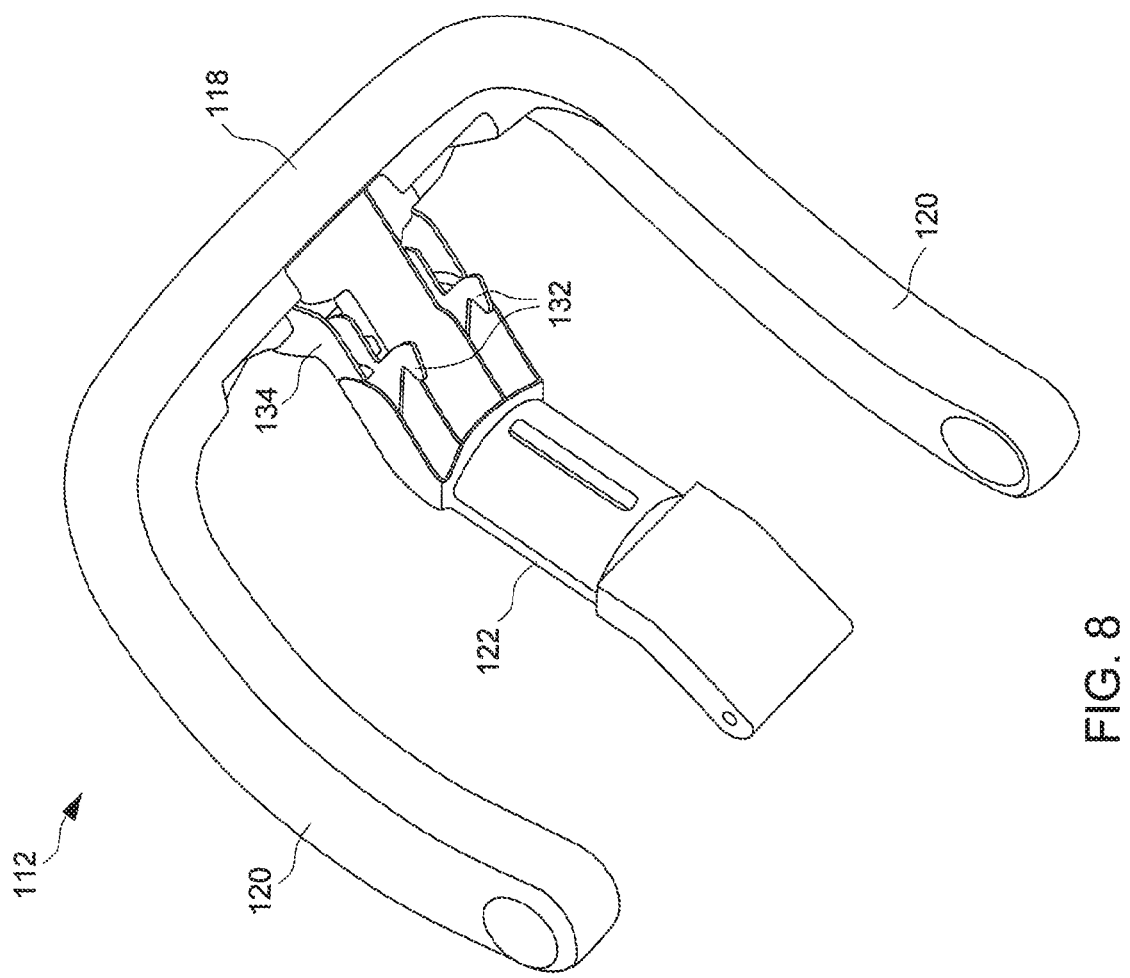
FIG. 8 is a schematic view illustrating a variant embodiment of a belt restraining frame having two latching members assembled with a middle portion of the belt restraining frame.
Figure 9:
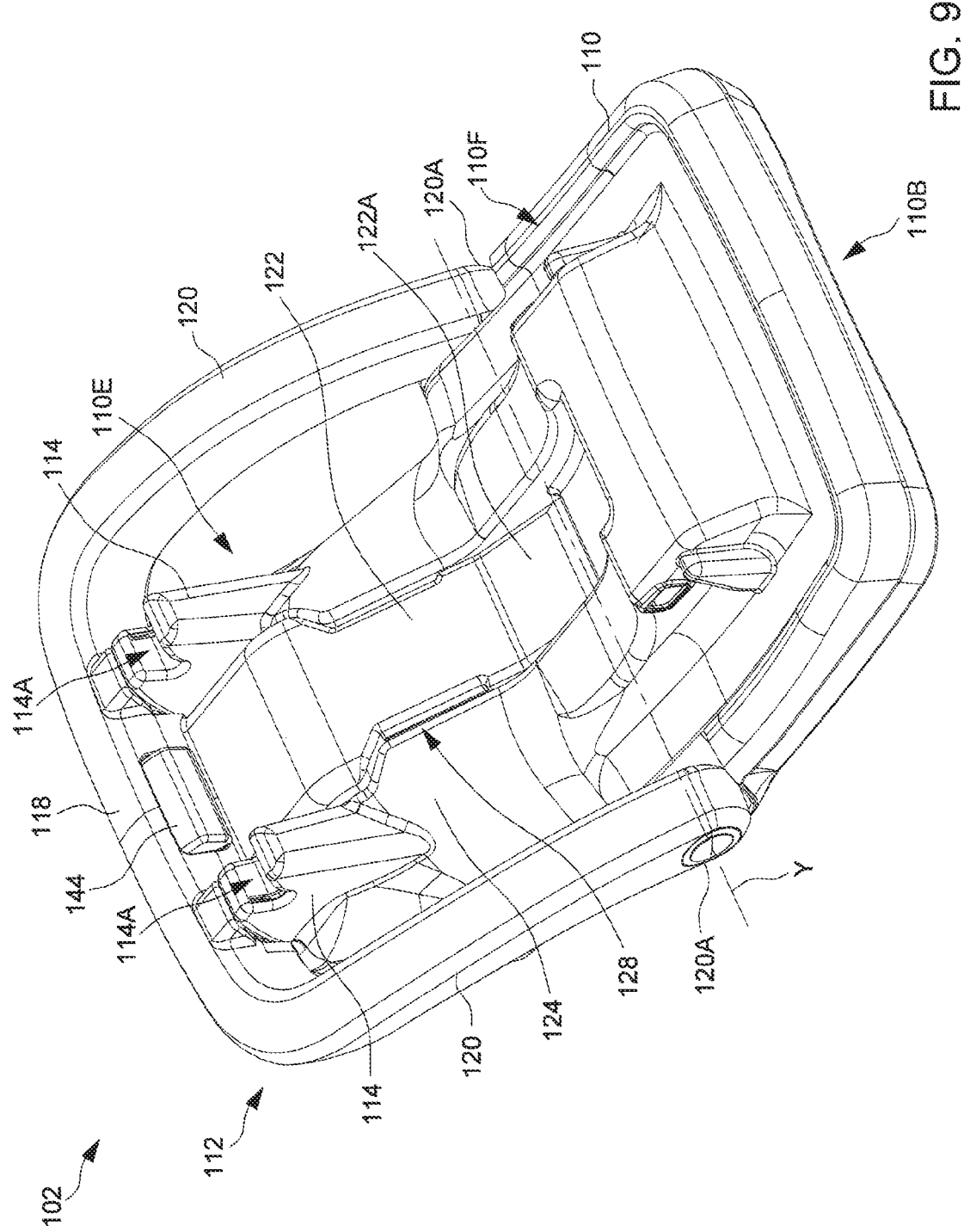
FIGS. 9-11 are schematic views illustrating the support base having another construction of a latch mechanism used for locking the belt restraining frame in the clamping position.
Figure 10:
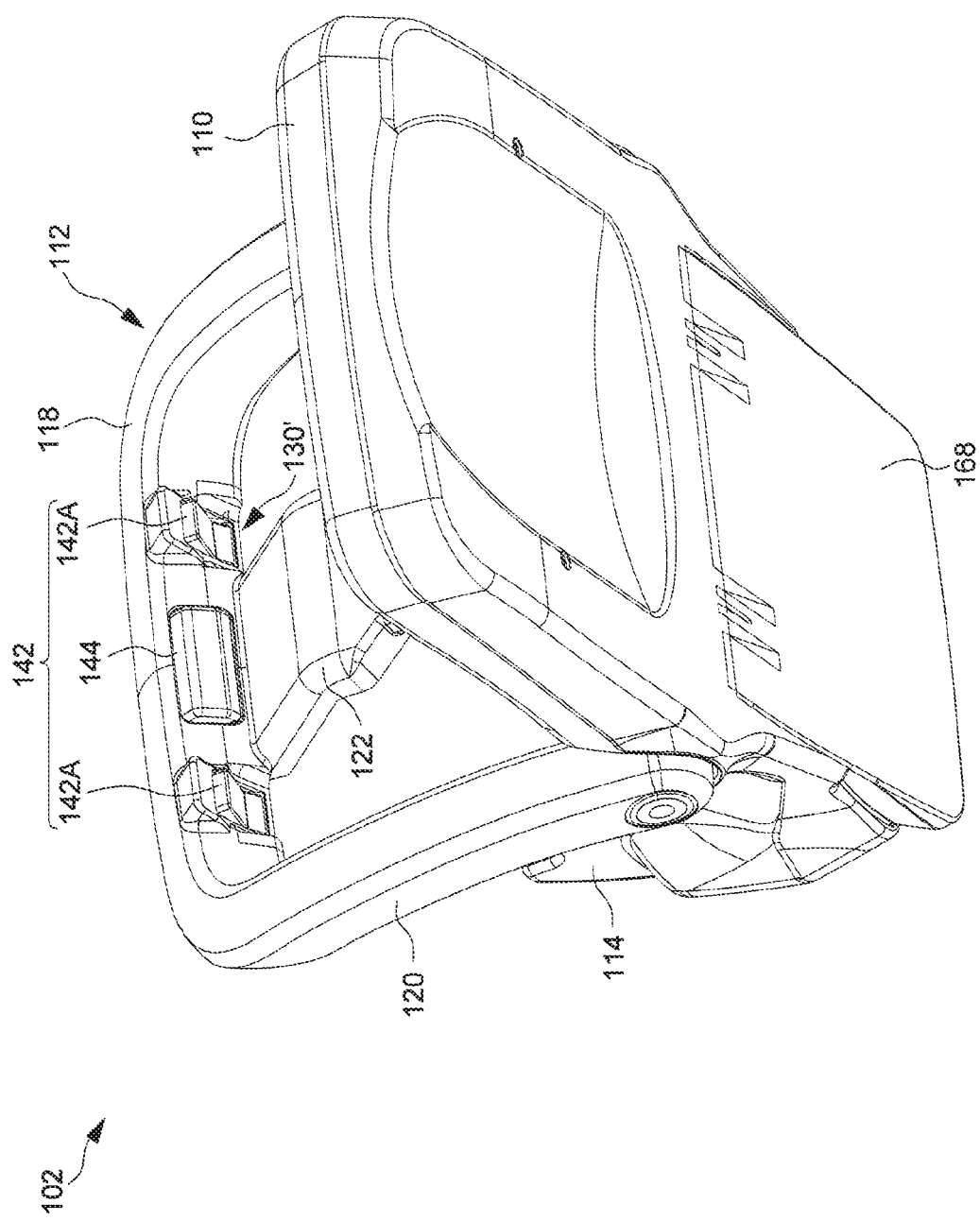
Figure 11:
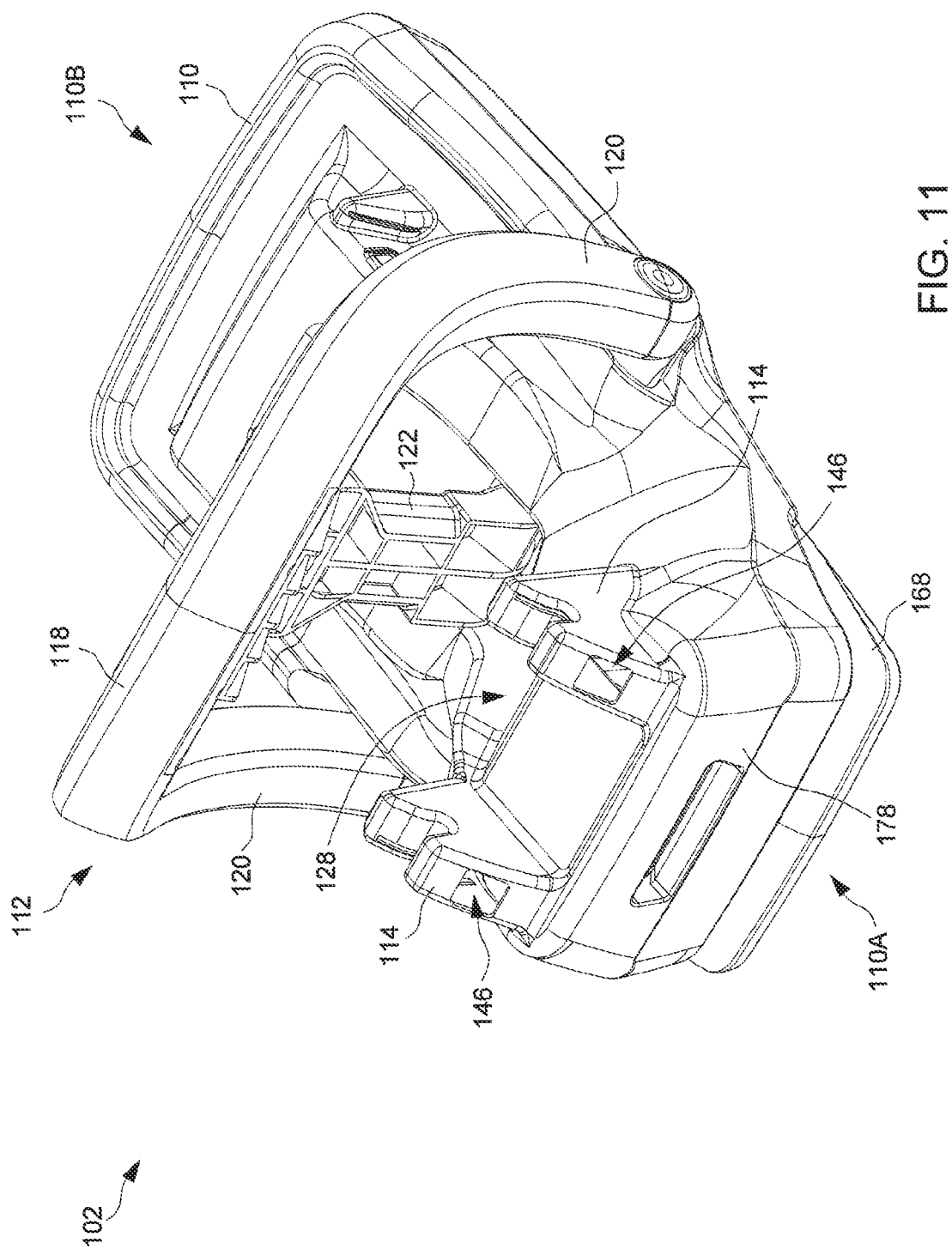
Figure 12:
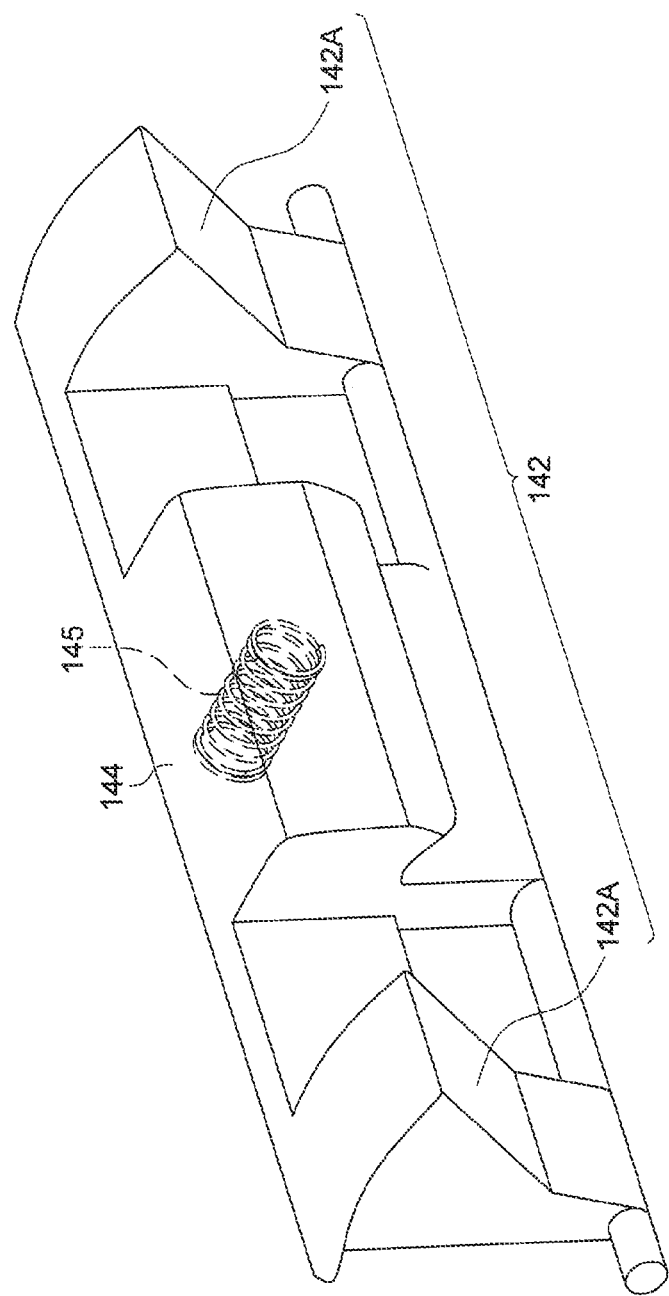
FIG. 12 is a schematic view illustrating a latching member and a release actuator used in the latch mechanism shown in FIGS. 9-11.

It will be appreciated that the latch mechanism 130 described herein may include more than one latching member 132 if needed. For example, FIG. 8 is a schematic view illustrating an embodiment in which two latching members 132 are pivotally connected with the middle portion 122 of the belt restraining frame 112 at two transversally spaced-apart locations. Like previously described, each of the two latching members 132 can be biased by a spring force to engage with one corresponding rod provided in the shell body 110. Moreover, the two latching members 132 can be connected with the release actuator 134, and can operate in the same manner as described previously to lock and unlock the belt restraining frame 112 with respect to the shell body 110.

FIGS. 9-12 are various schematic views illustrating another embodiment of a latch mechanism 130' for locking and unlocking the belt restraining frame 112 with respect to the shell body 110. Referring to FIGS. 9-12, the latch mechanism 130' can include a latching member 142 and a release actuator 144 connected with each other, both of which being assembled with the belt restraining frame 112. The latching member 142 and the release actuator 144 are assembled with the transversal portion 118 of the belt restraining frame 112. The latching member 142 is pivotally connected with the transversal portion 118, and has two protrusions 142A spaced apart from each other that can protrude outward through two openings provided on the transversal portion 118. The release actuator 144 can have a button shape, and can be affixed with the latching member 142, e.g., by attachment or by having the release actuator 144 and the latching member 142 formed integrally as a single part. The release actuator 144 can be disposed adjacent to a junction between the middle portion 122 and the transversal portion 118, and can be exposed for manual operation. Once the latching member 142 and the release actuator 144 are assembled with the belt restraining frame 112, the release actuator 144 is located centrally on the transversal portion 118, and the two protrusions 142A of the latching member 142 are located on two opposite sides of the middle portion 122 and release actuator 144.

Like previously described, the latching member 142 can engage with a corresponding structure provided on the shell body 110 to lock the belt restraining frame 112 in the clamping position, and the release actuator 144 is operable to disengage the latching member 142 from the corresponding structure on the shell body 110 for unlocking the belt restraining frame 112. In one embodiment, the corresponding structure provided on the shell body 110 for locking engagement of the latching member 142 can include two openings 146 (better shown in FIG. 11) disposed on a side of the two seat mounts 114 that faces the same direction as the end 110A of the shell body 110. When the belt restraining frame 112 is in the clamping position, the two protrusions 142A of the latching member 142 can respectively engage with the two openings 146 on two opposite sides of the middle portion 122 to prevent rotation of the belt restraining frame 112 and lock the belt restraining frame 112 with the shell body 110. A spring 145 (shown with phantom lines in FIG. 12) connected with the release actuator 144 and/or the latching member 142 may be used to bias the latching member 142 to the locking state. For unlocking the belt restraining frame 112, the release actuator 144 can depressed so as to drive movement of the latching member 142 for disengaging the protrusions 142A from the openings 146. The belt restraining frame 112 is thereby unlocked, and can be rotated to the release position.

In conjunction with FIGS. 6 and 7, FIGS. 13 and 14 are schematic views illustrating an embodiment in which a storage feature can be provided in the support base 102. For clarity, the middle portion 122 of the belt restraining frame 112 is omitted in FIG. 14 to better show the storage feature. Referring to FIGS. 6, 7, 13 and 14, the support base 102 can further include a storage cavity 150 provided in the shell body 110. The storage cavity 150 is opened on the upper surface 124 of the shell body 110 at the opening 128, and is sized to receive an attachment strap 152 and two latch connectors 154 that are coupled with the shell body 110. The attachment strap 152 has two opposite free ends, and the two latch connectors 154 are attached with the two free ends of the attachment strap 152. The attachment strap 152 and the two latch connectors 154 can be deployed outside the storage cavity 150 and installed as the anchoring belt B described previously for fastening the support base 102 on a vehicle seat, the two latch connectors 154 engaging and locking with a vehicle anchorage. When they are unused, the attachment strap 152 and the two latch connectors 154 can be stowed in the storage cavity 150.

Figure 15:
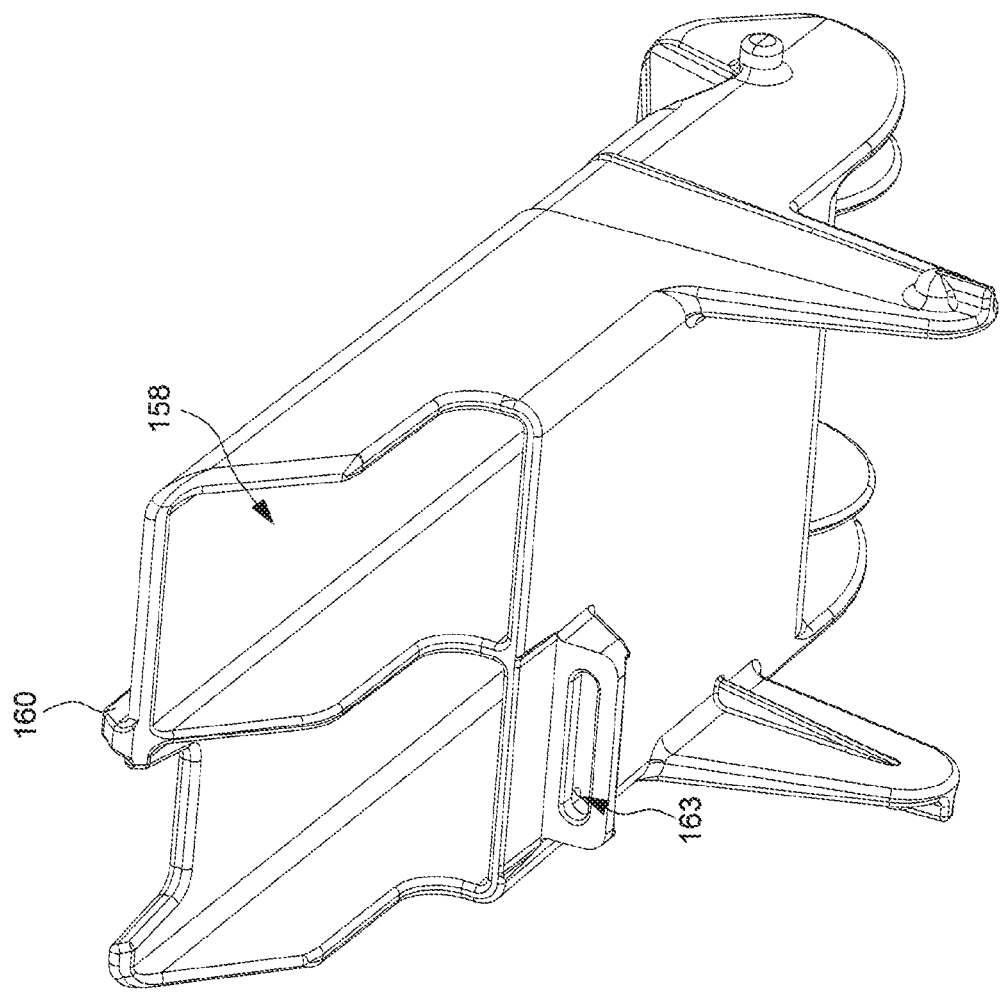
FIG. 15 is a schematic view illustrating a receptacle provided in a storage cavity of the support base.

In one embodiment, the storage cavity 150 can further contain a movable receptacle 156. FIG. 15 is a schematic view illustrating the receptacle 156 alone. The receptacle 156 can be exemplary provided as a casing having an interior where the two latch connectors 154 can be placed when they are unused. The receptacle 156 can further have an opening 158 through which the interior of the receptacle 156 can be accessed for stowing or retrieving the latch connectors 154. An upper surface of the receptacle 156 can have a protruding rib 160.

Figure 16:
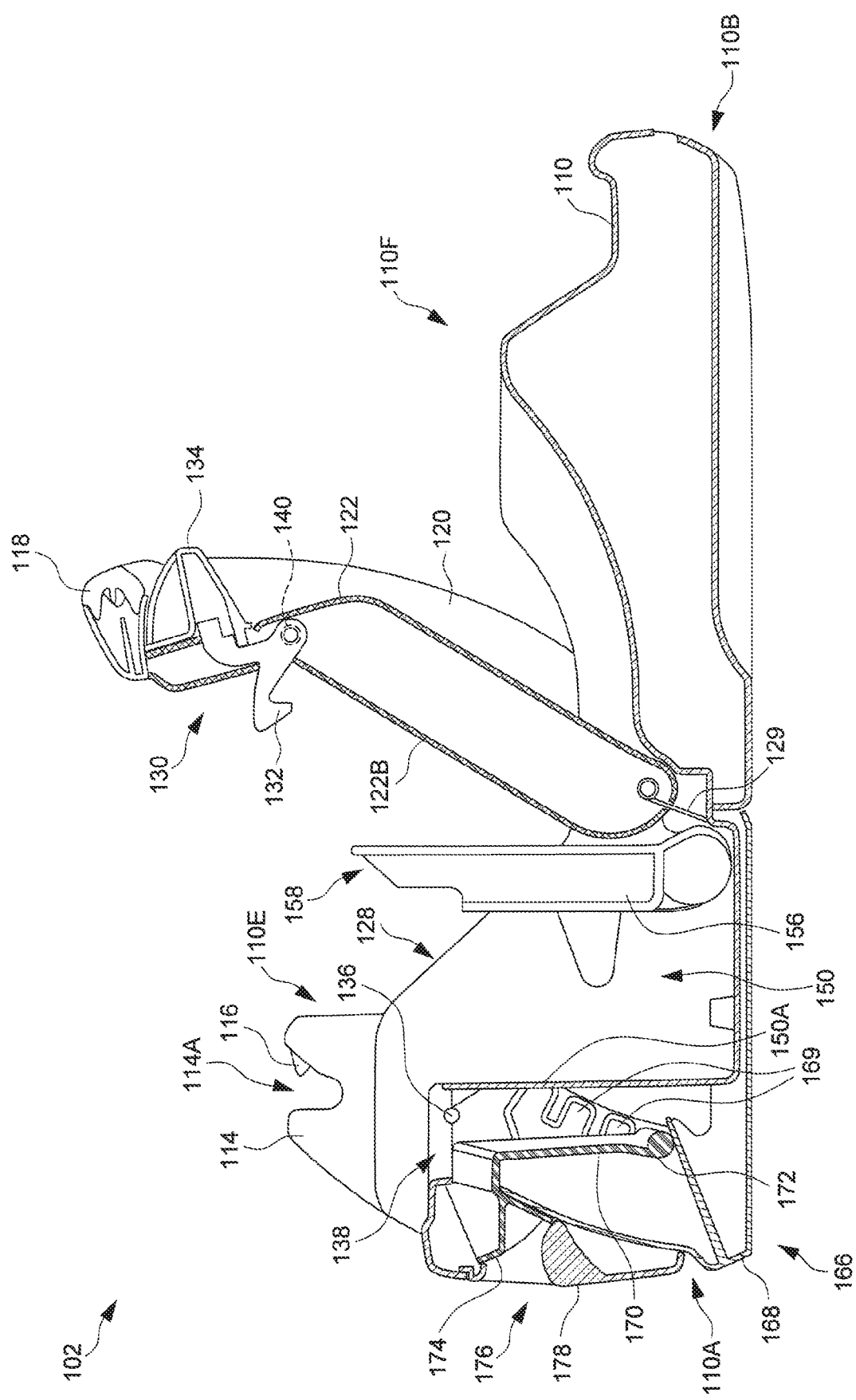
FIG. 16 is a cross-sectional view illustrating the support base with the belt restraining frame in the release position and the receptacle in an access position.

Referring to FIGS. 6, 7 and 13-15, the receptacle 156 can be pivotally connected with the shell body 110 inside the storage cavity 150, thereby allowing the receptacle 156 to rotate relative to the shell body 110 between an access position as shown in FIG. 16 and a closed position as shown in FIGS. 6 and 7. When the receptacle 156 is in the access position shown in FIG. 16, the opening 158 faces upward for facilitating placement of the two latch connectors 154 in the receptacle 156 or retrieval of the two latch connectors 154 from the receptacle 156. When the receptacle 156 is in the closed position, the opening 158 faces an inner sidewall 150A of the storage cavity 150, which blocks access to the interior of the receptacle 156.

A leash 162 can be provided for coupling the attachment strap 152 with the shell body 110. In one embodiment, the leash 162 can be connected with the attachment strap 152 and anchored with the receptacle 156 at an underside thereof, e.g., at the location 163 of the receptacle 156 shown in FIG. 15. In another embodiment, the leash 162 may be connected with the attachment strap 152 and anchored directly with the shell body 110.

Figure 17:
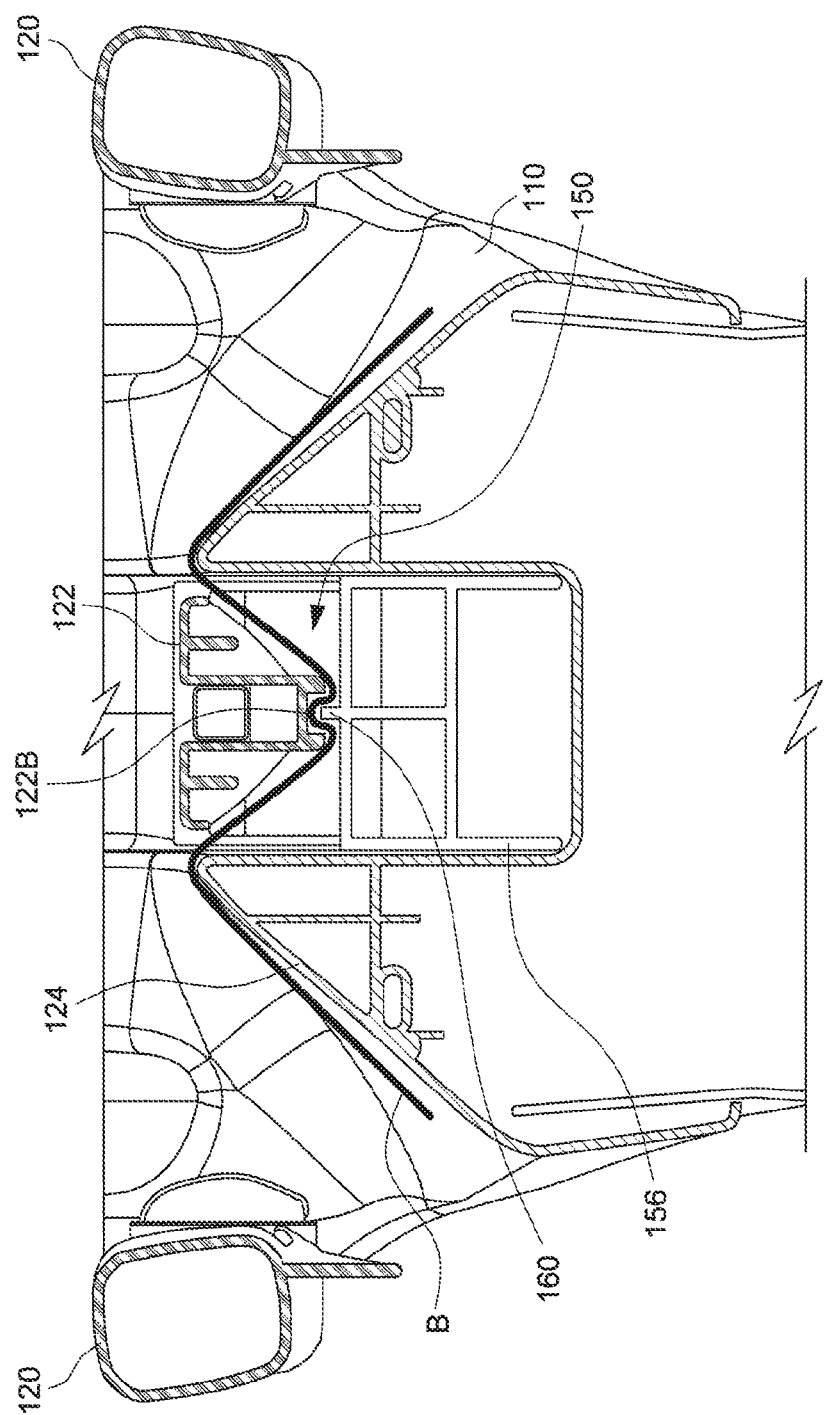
FIG. 17 is a schematic cross-sectional view illustrating an anchoring belt captured between the receptacle and a middle portion of the belt restraining frame in the clamping position.

Referring to FIGS. 2, 6, 7, 13 and 14, the storage cavity 150 and the receptacle 156 are disposed in a region of the shell body 110 that can be covered by the middle portion 122 of the belt restraining frame 112. For facilitating routing of the anchoring belt B across the storage cavity 150, the two belt guides 126 may be positioned on the upper surface 124 at two transversally opposite sides of the storage cavity 150. When the belt restraining frame 112 is in the clamping position adjacent to the upper surface 124 of the shell body 110, the storage cavity 150 is adjacent to an underside of the middle portion 122, and the middle portion 122 can substantially or entirely close the storage cavity 150 at the upper side thereof. Moreover, the underside of the middle portion 122 can project into the storage cavity 150 and lie substantially close to the receptacle 156. While the anchoring belt B (e.g., a vehicle seatbelt or the attachment strap 152) used for fastening the support base 102 on a vehicle seat is routed transversally across the storage cavity 150, the middle portion 122 can accordingly press a portion of the anchoring belt B into the storage cavity 150 so that it is oppositely squeezed between the receptacle 156 placed in its closed position and the middle portion 122. FIG. 17 is a schematic cross-sectional view illustrating the anchoring belt B captured between the receptacle 156 and the middle portion 122 of the belt restraining frame 112 in the clamping position. The respective contacts applied on the two opposite sides of the anchoring belt B by the protruding rib 160 of the receptacle 156 and the underside of the middle portion 122 can grip the anchoring belt B, and prevent its slipping.

When the belt restraining frame 112 rises away from the upper surface 124 of the shell body 110 in the release position, the middle portion 122 can open the storage cavity 150. While the storage cavity 150 is opened, a caregiver can access the interior of the storage cavity 150 and rotate the receptacle 156 so that its opening 158 faces upward as shown in FIG. 16 for facilitating stowing or retrieving of the attachment strap 152 and the two latch connectors 154.

Figure 18:
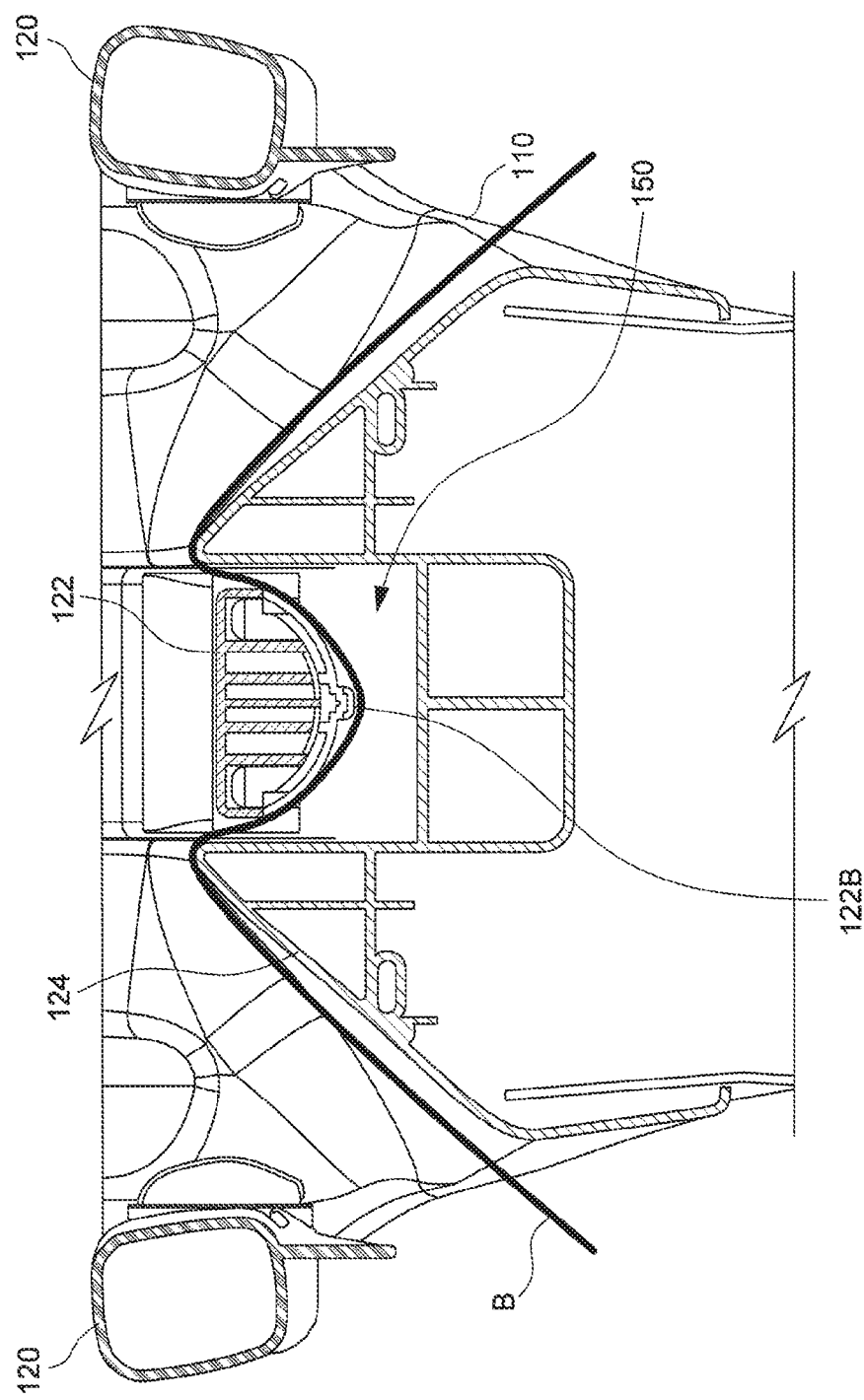
FIG. 18 is a schematic cross-sectional view illustrating an embodiment in which no receptacle is provided in the storage cavity of the support base.

While the receptacle 156 can provide some advantageous features as described previously, it will be appreciated that certain embodiments may also omit the receptacle 156. FIG. 18 is a schematic cross-sectional view illustrating an example in which the storage cavity 150 of the shell body 110 has no receptacle 156. In the embodiment shown in FIG. 18, the middle portion 122 can likewise press a portion of the anchoring belt B into the storage cavity 150 while the belt restraining frame 112 is in the clamping position, which convolutes the belt path for better gripping of the anchoring belt B. As described previously, the lower surface 122B of the middle portion 122, which is in contact with the anchoring belt B, can have a frictional material for preventing slippage of the anchoring belt B. While the middle portion 122 of the belt restraining frame 112 is in the clamping position, a gap may be left between the lower surface 122B/anchoring belt B and a bottom of the storage cavity 150.

The aforementioned embodiments provide the storage cavity 150 in the shell body 110 of the support base 102 for storing the attachment strap 152 and the latch connectors 154. However, other embodiments not shown may relocate the storage cavity to a different position as desired. For example, the middle portion 122 of the belt restraining frame 112 may also be enlarged to have an inner hollow volume configurable as a storage cavity for receiving the attachment strap 152 and the latch connectors 154.

Figure 19:
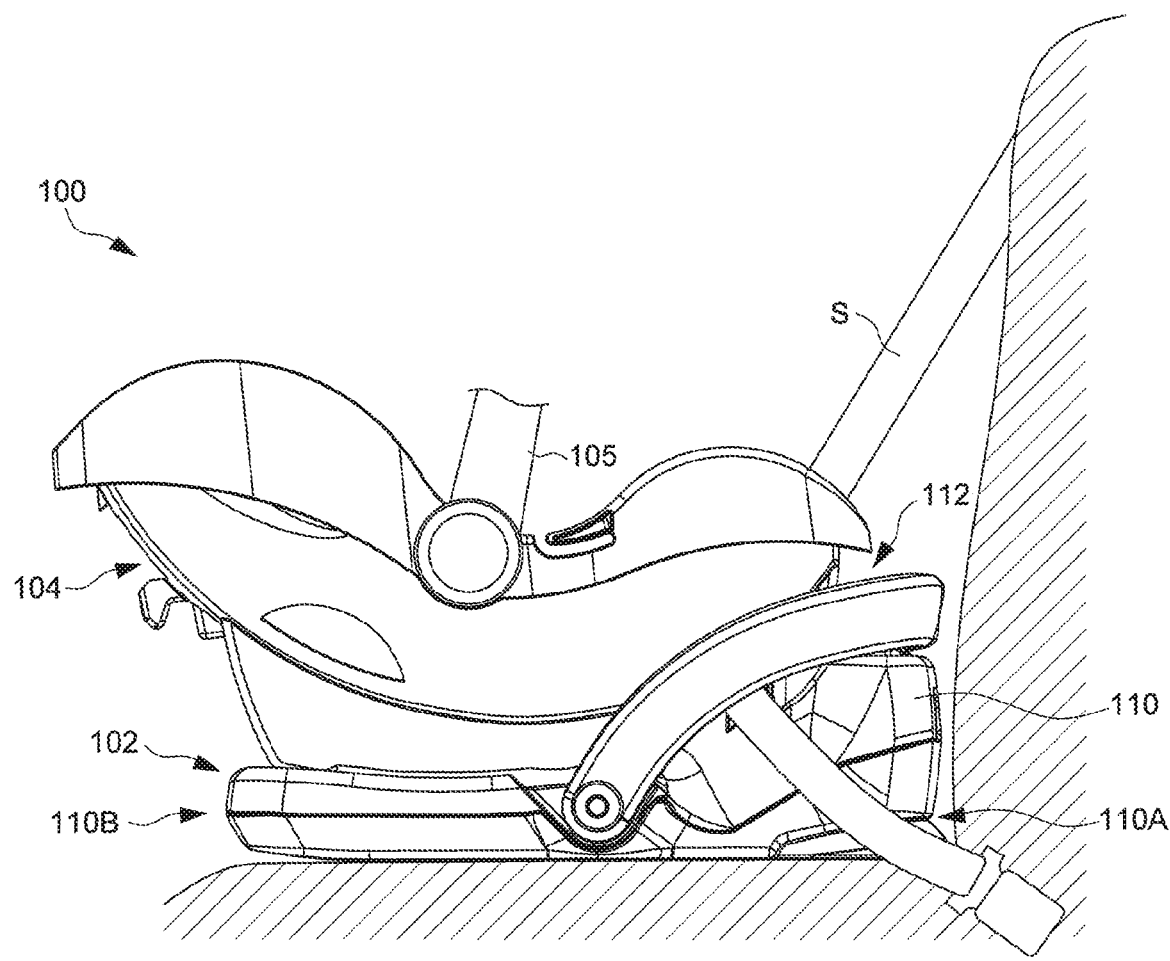
FIG. 19 is a schematic view illustrating the child safety seat in a use configuration in which the support base is fastened on a vehicle seat with a vehicle seatbelt used as an anchoring belt.
Figure 20:
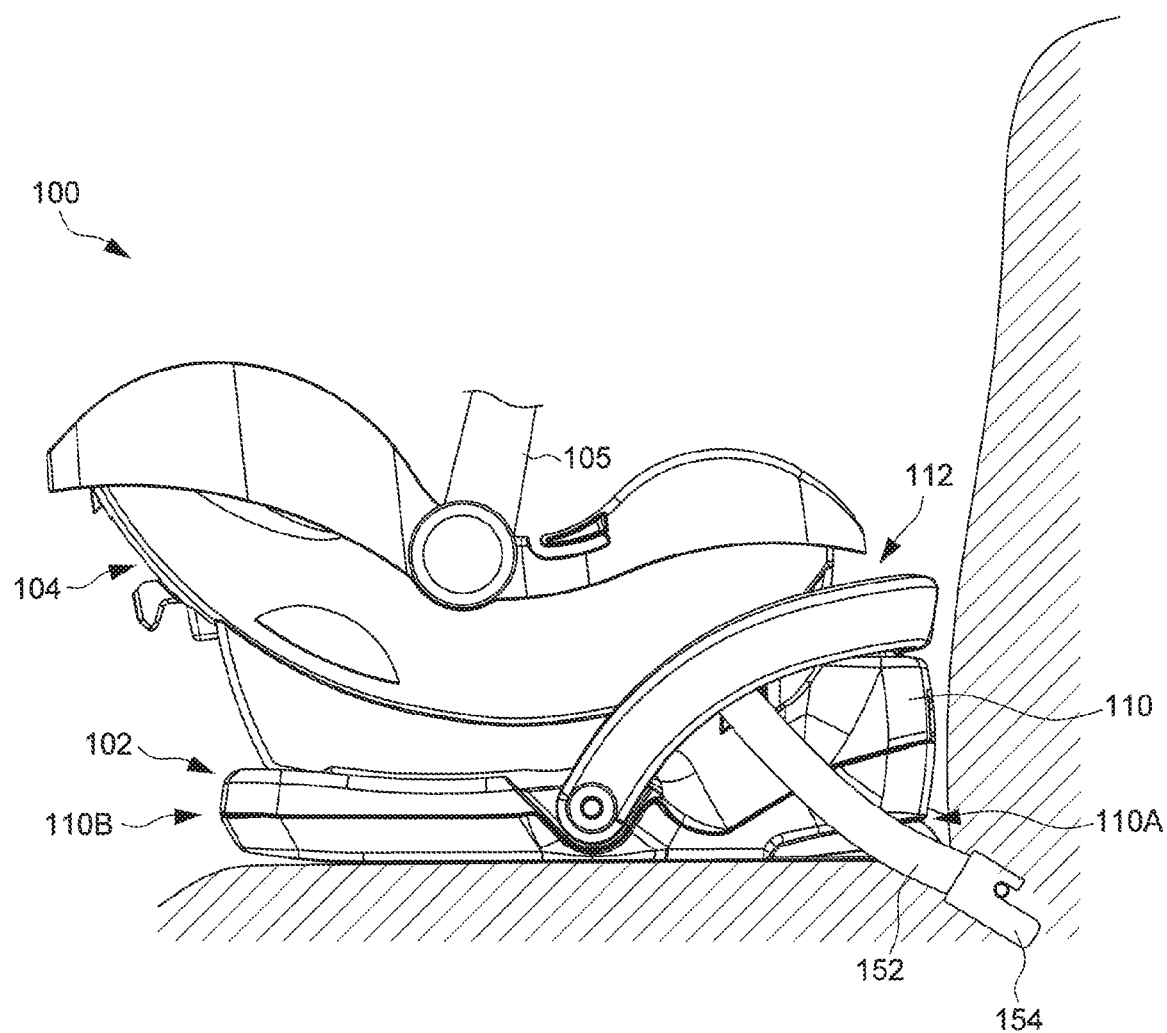
FIG. 20 is a schematic view illustrating the child safety seat in a use configuration in which the support base is fastened on a vehicle seat with a separately provided attachment strap used as an anchoring belt.

FIGS. 19 and 20 are schematic views illustrating two exemplary use configurations of the child safety seat 100. In FIG. 19, the child safety seat 100 is shown in a use configuration in which the support base 102 is fastened on a vehicle seat with a vehicle seatbelt S used as an anchoring belt. The lap strap portion of the vehicle seatbelt S can be tightly held with the belt restraining frame 112 in the clamping position as described previously. In FIG. 20, the child safety seat 100 is shown in another use configuration in which the support base 102 is fastened on a vehicle seat with the attachment strap 152 used as an anchoring belt, the latch connectors 154 of the attachment strap 152 engaging with a fixed anchorage provided in the vehicle.

Referring again to FIGS. 2, 6 and 7, the support base 102 can further include a recline adjustment mechanism 166. The recline adjustment mechanism 166 can include a foot 168 and a recline actuator 170. The foot 168 is pivotally connected with the shell body 110, and is disposed at the bottom of the shell body 110 adjacent to the end 110A. The foot 168 is rotatable relative to the shell body 110 between a retracted position and an extended position for lowering and raising the end 110A of the shell body 110, thereby modifying an inclination of the support base 102 with respect to a support surface (e.g., vehicle seat surface) on which it is placed. The foot 168 can include a plurality of locking grooves 169 corresponding to different angular positions of the support base 102, and the recline actuator 170 can engage with any of the locking grooves 169 to lock the foot 168 in position.

The recline actuator 170 is pivotally connected with the shell body 110, and can include a latching portion 172 and an operating portion 174. In one embodiment, the recline actuator 170, including the latching portion 172 and the operating portion 174, may be formed integrally as a single part. The latching portion 172 can engage with any of the locking grooves 169 to lock the foot 168 in position. The operating portion 174 is exposed through an opening 176 formed through an end surface 178 of the shell body 110 extending generally vertical at its end 110A. The operating portion 174 can be manually operated for driving an unlocking rotation of the recline actuator 170 to disengage the latching portion 172 from the foot 168, thereby allowing recline adjustment of the support base 102.

Advantages of the child safety seat described herein include the ability to provide a support base that can be easily fastened on a vehicle seat and prevent erroneous installation. Moreover, the support base can include a storage feature allowing convenient storage of an attachment strap used for fastening the support base on a vehicle seat.

Realizations of the support base and child safety seat have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, the support base comprising:
    a shell body configured to support a child seat, the shell body having an upper surface and a storage cavity sized to receive an attachment strap and two latch connectors; and
    a belt restraining frame pivotally connected with the shell body, the belt restraining frame being rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity, wherein the belt restraining frame includes a transversal portion, two side portions, and a middle portion located between the two side portions, the two side portions and the middle portion being fixedly connected with the transversal portion and having respective ends connected pivotally with the shell body, the middle portion closing the storage cavity when the belt restraining frame is in the clamping position.

2. The support base according to claim 1, wherein the two side portions of the belt restraining frame are respectively connected pivotally with two lateral sides of the shell body, and the middle portion of the belt restraining frame is pivotally connected with a central region of the shell body between the two lateral sides.

3. The support base according to claim 1, wherein the shell body further includes two seat mounts protruding upward and transversally spaced apart from each other, and the middle portion in the clamping position extends in a region of the shell body delimited between the two seat mounts.

4. The support base according to claim 1, wherein the shell body further includes a plurality of belt guides for routing an anchoring belt across the storage cavity, and an underside of the middle portion projects into the storage cavity for pressing the anchoring belt in the storage cavity when the belt restraining frame is in the clamping position.

5. The support base according to claim 1, wherein the belt restraining frame is assembled with a latching member and a release actuator that are connected with each other, the latching member engaging with a corresponding structure provided on the shell body to lock the belt restraining frame in the clamping position, and the release actuator being operable to disengage the latching member from the corresponding structure of the shell body for unlocking the belt restraining frame.

6. The support base according to claim 5, wherein the release actuator is disposed adjacent to a junction between the middle portion and the transversal portion of the belt restraining frame.

7. The support base according to claim 5, wherein the latching member engages with the corresponding structure provided on the shell body at a location below the middle portion of the belt restraining frame.

8. The support base according to claim 5, wherein the latching member engages with the corresponding structure provided on the shell body on two opposite sides of the middle portion of the belt restraining frame.

9. The support base according to claim 1, wherein the shell body is coupled with an attachment strap, the attachment strap having two ends respectively provided with two latch connectors that are operable to lock with a vehicle anchorage, the attachment strap and the two latch connectors being stowable into the storage cavity and deployable outside the storage cavity for use as the anchoring belt held by the belt restraining frame in the clamping position.

10. The support base according to claim 9, wherein the storage cavity contains a movable receptacle adapted to receive the two latch connectors.

11. The support base according to claim 10, wherein the receptacle has an opening, the receptacle being rotatable to a position where the opening faces upward for facilitating placement of the two latch connectors in the receptacle or retrieval of the two latch connectors from the receptacle.

12. The support base according to claim 10, wherein the attachment strap is connected with a leash that is anchored with the receptacle.

13. The support base according to claim 10, wherein the belt restraining frame in the clamping position has a portion that projects into the storage cavity and is substantially close to the receptacle, thereby the belt restraining frame and the receptacle being adapted to oppositely squeeze an anchoring belt that is routed across the storage cavity.

14. A support base for a child safety seat, the support base comprising:
    a shell body configured to support a child seat, the shell body having an upper surface and a storage cavity sized to receive an attachment strap and two latch connectors, the storage cavity further containing a movable receptacle adapted to receive the two latch connectors; and
    a belt restraining frame pivotally connected with the shell body, the belt restraining frame being rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity.

15. The support base according to claim 14, wherein the receptacle has an opening, the receptacle being rotatable to a position where the opening faces upward, thereby facilitating placement of two latch connectors in the receptacle or retrieval of the two latch connectors from the receptacle.

16. The support base according to claim 14, wherein the shell body is coupled with an attachment strap, the attachment strap having two ends respectively provided with two latch connectors that are operable to lock with a vehicle anchorage, the attachment strap and the two latch connectors being stowable into the storage cavity and deployable outside the storage cavity for use as an anchoring belt held by the belt restraining frame in the clamping position.

17. The support base according to claim 16, wherein the attachment strap is connected with a leash that is anchored with the receptacle.

18. The support base according to claim 14, wherein the belt restraining frame in the clamping position has a portion that projects into the storage cavity and is substantially close to the receptacle, thereby the belt restraining frame and the receptacle being adapted to oppositely squeeze an anchoring belt that is routed across the storage cavity.

19. A support base for a child safety seat, the support base comprising:
    a shell body configured to support a child seat, the shell body being coupled with an attachment strap having two ends respectively provided with two latch connectors that are operable to lock with a vehicle anchorage, the shell body having an upper surface and a storage cavity sized to receive the attachment strap and the two latch connectors; and
    a belt restraining frame pivotally connected with the shell body, the belt restraining frame being rotatable relative to the shell body between a release position where the belt restraining frame rises away from the upper surface of the shell body so that the storage cavity is opened upwardly, and a clamping position where the belt restraining frame is adjacent to the upper surface for holding an anchoring belt that is routed across the storage cavity, wherein the attachment strap and the two latch connectors are stowable into the storage cavity and deployable outside the storage cavity for use as the anchoring belt held by the belt restraining frame in the clamping position.

\* \* \* \* \*